(12) United States Patent
Nomoto et al.

(10) Patent No.: US 10,529,103 B2
(45) Date of Patent: Jan. 7, 2020

(54) IMAGE PROCESSING APPARATUS AND METHOD FOR COLLATING A PLURALITY OF IMAGES

(71) Applicant: CANON KABUSHIKI KAISHA, Tokyo (JP)

(72) Inventors: Atsuo Nomoto, Tokyo (JP); Hiroshi Sato, Kawasaki (JP); Yuji Kaneda, Kawasaki (JP); Shunsuke Nakano, Kawasaki (JP); Yoshinori Ito, Tokyo (JP); Daisuke Nishino, Kawasaki (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 15/397,096

(22) Filed: Jan. 3, 2017

(65) Prior Publication Data

US 2017/0193681 A1 Jul. 6, 2017

(30) Foreign Application Priority Data

Jan. 5, 2016 (JP) ................... 2016-000700

(51) Int. Cl.
*G06K 9/00* (2006.01)
*G06T 11/60* (2006.01)
(Continued)

(52) U.S. Cl.
CPC .......... *G06T 11/60* (2013.01); *G06K 9/00268* (2013.01); *G06K 9/00288* (2013.01);
(Continued)

(58) Field of Classification Search
CPC .......... G06K 9/00221; G06K 9/22228; G06K 9/22248; G06K 9/00261; G06K 9/00268;
(Continued)

(56) References Cited

U.S. PATENT DOCUMENTS 8,401,313 B2 3/2013 Yamamoto et al.
8,885,930 B2 11/2014 Yamamoto et al.
(Continued)

FOREIGN PATENT DOCUMENTS

JP 2006306191 A 11/2006
JP 2009-510541 A 3/2009
(Continued)

OTHER PUBLICATIONS

Viola, P., et al., "Robust Real-Time Face Detection," International Journal of Computer Vision, May 2004, pp. 137-154, vol. 57, Issue 2.

(Continued)

*Primary Examiner* — Jose L Couso
(74) *Attorney, Agent, or Firm* — Carter, DeLuca & Farrell LLP

(57) ABSTRACT

An image processing apparatus comprises a detecting unit which detects an object from an input image, an extracting unit which extracts a feature amount of the object detected by the detecting unit, a similarity calculating unit which, in a case where a plurality of objects have been detected from the same input image by the detecting unit, calculates a degree of similarity of feature amounts of the plurality of objects, and an adjusting unit which adjusts a collating method of collating the plurality of objects based on respective feature amounts, on the basis of the degree of similarity calculated by the similarity calculating unit.

16 Claims, 12 Drawing Sheets

(51) Int. Cl.
*G06T 7/246* (2017.01)
*G06K 9/62* (2006.01)

(52) U.S. Cl.
CPC ......... *G06K 9/6215* (2013.01); *G06K 9/6262* (2013.01); *G06T 7/248* (2017.01); *G06T 2207/10004* (2013.01); *G06T 2207/20012* (2013.01); *G06T 2207/30201* (2013.01)

(58) Field of Classification Search
CPC ........... G06K 9/00275; G06K 9/00281; G06K 9/00288; G06K 9/00295; G06K 9/00302; G06K 9/00308; G06K 9/00315; G06K 9/00362; G06K 9/00369; G06K 9/00604; G06K 9/00744; G06K 9/00771; G06K 9/00993; G06K 9/46; G06K 9/4671; G06K 9/62; G06K 9/6215; G06K 9/6262; G06K 9/627; G06K 9/6282; G06K 9/6255; G06K 9/68; G06K 2009/00322; G06K 2009/00328; G06K 2209/00322; G06K 2209/00328; G06T 11/60; G06T 11/00; G06T 1/00; G06T 7/00; G06T 7/20; G06T 7/70; G06T 7/246; G06T 7/248; G06T 2207/30196; G06T 2207/10004; G06T 2207/20012; G06T 2207/30201; G06T 2207/10016; G06T 2207/30232; G06F 3/011; G06F 3/012; G06F 3/013; G06F 3/0304; G06F 17/30793; H04N 7/18; H04N 7/181; H04N 7/183; H04N 7/185; H04N 7/188; H04N 1/00336; H04N 5/23219; H04N 21/44218

See application file for complete search history.

(56) References Cited

U.S. PATENT DOCUMENTS

| | | | | |
|---|---|---|---|---|
| 9,602,783 | B2* | 3/2017 | Sugishita | H04N 7/181 |
| 2004/0197013 | A1* | 10/2004 | Kamei | G06K 9/00268 |
| | | | | 382/118 |
| 2009/0034805 | A1* | 2/2009 | Perlmutter | G06F 17/30256 |
| | | | | 382/118 |
| 2010/0033302 | A1* | 2/2010 | Yamamoto | G06K 9/00771 |
| | | | | 340/5.82 |
| 2013/0050502 | A1* | 2/2013 | Saito | G06T 7/20 |
| | | | | 348/169 |
| 2013/0121584 | A1* | 5/2013 | Bourdev | G06K 9/00281 |
| | | | | 382/190 |
| 2014/0079299 | A1* | 3/2014 | Sukegawa | G06K 9/00288 |
| | | | | 382/118 |
| 2014/0247374 | A1* | 9/2014 | Murakami | H04N 5/23219 |
| | | | | 348/222.1 |
| 2014/0270370 | A1* | 9/2014 | Saito | G06K 9/00288 |
| | | | | 382/103 |
| 2015/0146921 | A1* | 5/2015 | Ono | H04N 7/18 |
| | | | | 382/103 |
| 2015/0235073 | A1* | 8/2015 | Hua | G06K 9/00288 |
| | | | | 382/118 |
| 2015/0356743 | A1* | 12/2015 | Kintou | G06T 3/40 |
| | | | | 382/103 |
| 2016/0034782 | A1 | 2/2016 | Nakano et al. | |
| 2016/0217319 | A1* | 7/2016 | Bhanu | G06K 9/00288 |
| 2016/0224824 | A1* | 8/2016 | Yamada | G06K 9/00255 |
| 2016/0247272 | A1 | 8/2016 | Nishino et al. | |
| 2016/0267339 | A1 | 9/2016 | Nakano et al. | |
| 2017/0351906 | A1* | 12/2017 | Oguchi | G06K 9/00255 |
| 2017/0357845 | A1* | 12/2017 | Yamaoka | G06T 7/00 |
| 2018/0082439 | A1* | 3/2018 | Saito | G06T 7/74 |

FOREIGN PATENT DOCUMENTS

| | | |
|---|---|---|
| JP | 2009-163555 A | 7/2009 |
| JP | 2010028404 A | 2/2010 |
| JP | 2013-003751 A | 1/2013 |
| JP | 2014063251 A | 4/2014 |
| JP | 2014182480 A | 9/2014 |
| JP | 2015158848 A | 9/2015 |
| WO | WO-2015129318 A1 * | 9/2015 |

OTHER PUBLICATIONS

Japanese Office Action for Application No. 2016000700 dated Nov. 12, 2019 with English translation.

* cited by examiner

RETRIEVAL RESULT DISPLAY SCREEN

| QUERY IMAGE | RETRIEVAL RESULT | | | |
|---|---|---|---|---|
| | IMAGE | DEGREE OF SIMILARITY | CAMERA NAME | TIME |
| (face) | (face) | 1000 | CAMERA 102 | 12:30 |
| (face) | (face) | 910 | CAMERA 102 | 11:45 |
| | (face) | 610 | CAMERA 103 | 10:30 |

CONSOLE SCREEN OF IMAGE RETRIEVING APPARATUS

IMAGE PROCESSING APPARATUS AND METHOD FOR COLLATING A PLURALITY OF IMAGES

BACKGROUND OF THE INVENTION

Field of the Invention

The invention relates to an image processing apparatus which collates a plurality of images, and a method which is used by the image processing apparatus.

Description of the Related Art

There is known a person retrieving technique of retrieving, out of image data photographed and captured by a plurality of cameras, when and by which camera a specific person was photographed. The person retrieving technique of that kind is usually applied to criminal investigation using mugshots, search for stray children using photographs of stray children's faces, and the like. In such fields to which the person retrieving technique is applied, since each camera has been installed at a different place, a photographing condition (including, e.g., a person's direction, an illumination condition, a lighting condition, and the like) for photographing a person is different for each camera. For this reason, a secure person retrieving technique in which an influence of the photographing condition of the kind is negligible is required.

In the person retrieving technique, the image data of each of registered persons and the image data of a person intended to be retrieved (i.e., a specific person) are collated (or compared) with each other, and the person of which a calculated degree of similarity in regard to the specific person is high is presented, thereby achieving the retrieval of the specific person. In the person retrieving technique like this, there has been provided a method which is secure about the photographing condition by adjusting such a collating process. Japanese Patent Application Laid-Open No. 2013-003751 discloses the method of reducing accuracy deterioration caused by the photographing condition, by using an image recognition technique of detecting the photographing condition from photographed and captured image data and adjusting a collation score based on the detected photographing condition. However, it is technically difficult to accurately detect the photographing condition such as the person's direction, the illumination condition, the lighting condition or the like, from the photographed image. For this reason, there is a case where the collation score is erroneously adjusted due to erroneous detection, so that the effect of reducing the accuracy deterioration is limited.

On the other hand, Japanese Patent Application Laid-Open No. 2009-163555 discloses the method of reducing accuracy deterioration caused by the photographing condition, by respectively adjusting a false acceptance rate (other-person acceptance rate) and a false rejection rate (person-in-question rejection rate) such that each of the relevant rates becomes a predetermined value, on the basis of the pairs of the image data of a person in question (a subject person) and the image data of other person (another person, a stranger or the like) collected for each camera. In the relevant method, the photographing condition is not detected, and instead the photographing conditions for the same camera are considered to be the same, so that it is possible to effectively adjust a collating process without erroneous detection.

However, in the related art, it is necessary to manually input correct answer information which indicates whether each of the pairs of the collected person image data indicates the person in question or the other person. Besides, when the collating process is adjusted based on a small amount of image data, the image data is adjusted unevenly or biasedly. Therefore, to prevent such inconvenience, a large amount of image data are necessary as learning data. For this reason, since it is necessary to manually input the correct answer information for the large amount of image data, it takes time and labor for the input, and the input itself is complicated. Thus, there is a problem that user-friendliness is low.

Consequently, the invention aims to reduce the work and trouble of the adjustment of the collating process.

SUMMARY OF THE INVENTION

According to one aspect of the invention, an image processing apparatus is characterized by comprising a detecting unit configured to detect an object from an input image, an extracting unit configured to extract a feature amount of the object detected by the detecting unit, a similarity calculating unit configured to, in a case where a plurality of objects have been detected from the same input image by the detecting unit, calculate a degree of similarity of feature amounts of the plurality of objects, and an adjusting unit configured to adjust a collating method of collating the plurality of objects based on respective feature amounts, on the basis of the degree of similarity calculated by the similarity calculating unit.

Further features of the present invention will become apparent from the following description of exemplary embodiments with reference to the attached drawings.

DESCRIPTION OF THE EMBODIMENTS

Preferred embodiments of the invention will now be described in detail in accordance with the accompanying drawings.

First Embodiment

In the first embodiment, an example that a collating process is adjusted for each camera (imaging device) before a specific person is retrieved out of image data photographed, captured and collected.

(Hardware Constitution)

Figure 1:
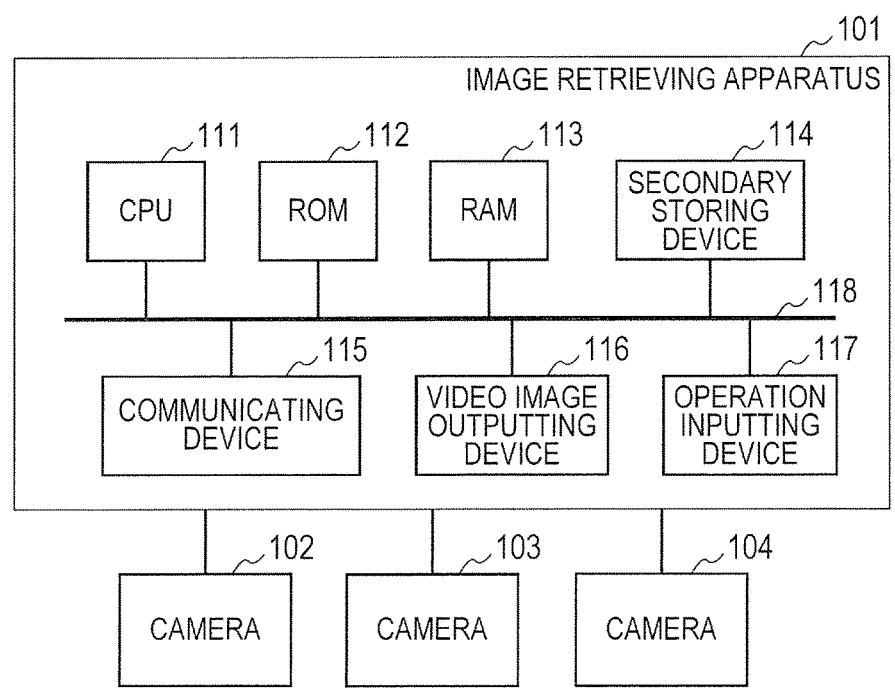
FIG. 1 is a block diagram for illustrating an example of the hardware constitution of a monitoring system.

FIG. 1 is a block diagram for illustrating an example of the hardware constitution of a monitoring system according to the present embodiment. More specifically, the monitoring system in the present embodiment comprises an image retrieving apparatus 101, a camera 102, a camera 103 and a camera 104.

The image retrieving apparatus 101 is an apparatus which retrieves the specific person from the image data input from the cameras 102 to 104 or the like. In the present embodiment, the image retrieving apparatus 101 is constituted by an information processing device such as a PC (personal computer) or the like.

Each of the cameras 102 to 104 is a network camera which comprises a visible light camera unit including imaging elements such as a lens, a CCD (charge-coupled device), a CMOS (complementary metal-oxide semiconductor) sensor and the like, a communicating device for connecting the camera with a network, and the like. Incidentally, each of the cameras 102 to 104 may be, instead of the network camera, another camera having a communication function. Moreover, the camera unit included in each of the cameras 102 to 104 may be an infrared camera instead of the visible light camera. In any case, each of the cameras 102 to 104 is an example of the imaging device. The process which is performed in the present embodiment is a process of adjusting the collating process of each imaging device by the image retrieving apparatus 101.

The image retrieving apparatus 101 and the cameras 102 to 104 are connected via a network, and they can mutually perform data communication.

In the present embodiment, the monitoring system comprises the three cameras (cameras 102 to 104). However, it may be possible for the monitoring system to comprise two or less cameras or to comprise four or more cameras.

As illustrated in FIG. 1, the image retrieving apparatus 101 comprises a CPU (central processing unit) 111, a ROM (read only memory) 112, a RAM (random access memory) 113, a secondary storing device 114, a communicating device 115, a video image outputting device 116 and a connection bus 118.

The CPU 111 controls the entire image retrieving apparatus by executing a control program stored in the ROM 112 and/or the RAM 113.

The ROM 112, which is a non-volatile memory, is used to store the control program and various parameters. The control program is executed by the CPU 111 to achieve later-described various processes. The RAM 113, which is a volatile memory, is used to temporarily store image data, the control program, and a result obtained by executing the control program.

The secondary storing device 114, which is a rewritable secondary storing device such as a hard disk, a flash memory or the like, is used to store the image data received from the cameras 102 to 104 via the communicating device 115. In addition, the secondary storing device 114 is used to store the control program, various set contents, processed results and the like. Such information is output to the RAM 113 and then used in the program execution by the CPU 111.

The communicating device 115, which is a wired communicating unit, performs data communication with the cameras 102 to 104 via the network. Incidentally, the communicating device 115 may be a wireless communicating unit.

The video image outputting device 116, which is a monitor such as a CRT (cathode-ray tube) monitor, a TFT (thin-film transistor) liquid crystal monitor or the like, displays the image data, the result obtained by executing the control program, and the like stored in the RAM 113 or the secondary storing device 114.

An operation inputting device 117 is an inputting device which accepts various operations from a user of a keyboard, a mouse or the like. The user inputs an instruction for retrieving the specific person out of the image data photographed and accumulated, an instruction for a later-described adjusting process, and the like, to the image retrieving apparatus 101 via the operation inputting device 117.

The connection bus 118 is used to mutually connect the respective hardware constitution elements included in the image retrieving apparatus 101. More specifically, the CPU 111, the ROM 112, the RAM 113, the secondary storing device 114, the communicating device 115 and the video image outputting device 116 mutually perform data communication via the connection bus 118.

When the CPU 111 performs the processes based on the programs stored in the ROM 112 or the secondary storing device 114, the functions of the image retrieving apparatus 101 later described with reference to FIG. 2 and the processes in later-described respective flow charts illustrated in FIGS. 3, 4, 7, 8, 10 and 13 are achieved.

Besides, it may be possible for each of the cameras 102 to 104 to achieve a part or the whole of the processes of the image retrieving apparatus 101. In such a case, the hardware which is necessary for the processes by the image retrieving apparatus 101 is provided in each of the cameras 102 to 104. Moreover, in this case, each of the cameras 102 to 104 exemplifies an information processing apparatus for performing the process in the present embodiment.

(Functional Constitution)

Figure 2:
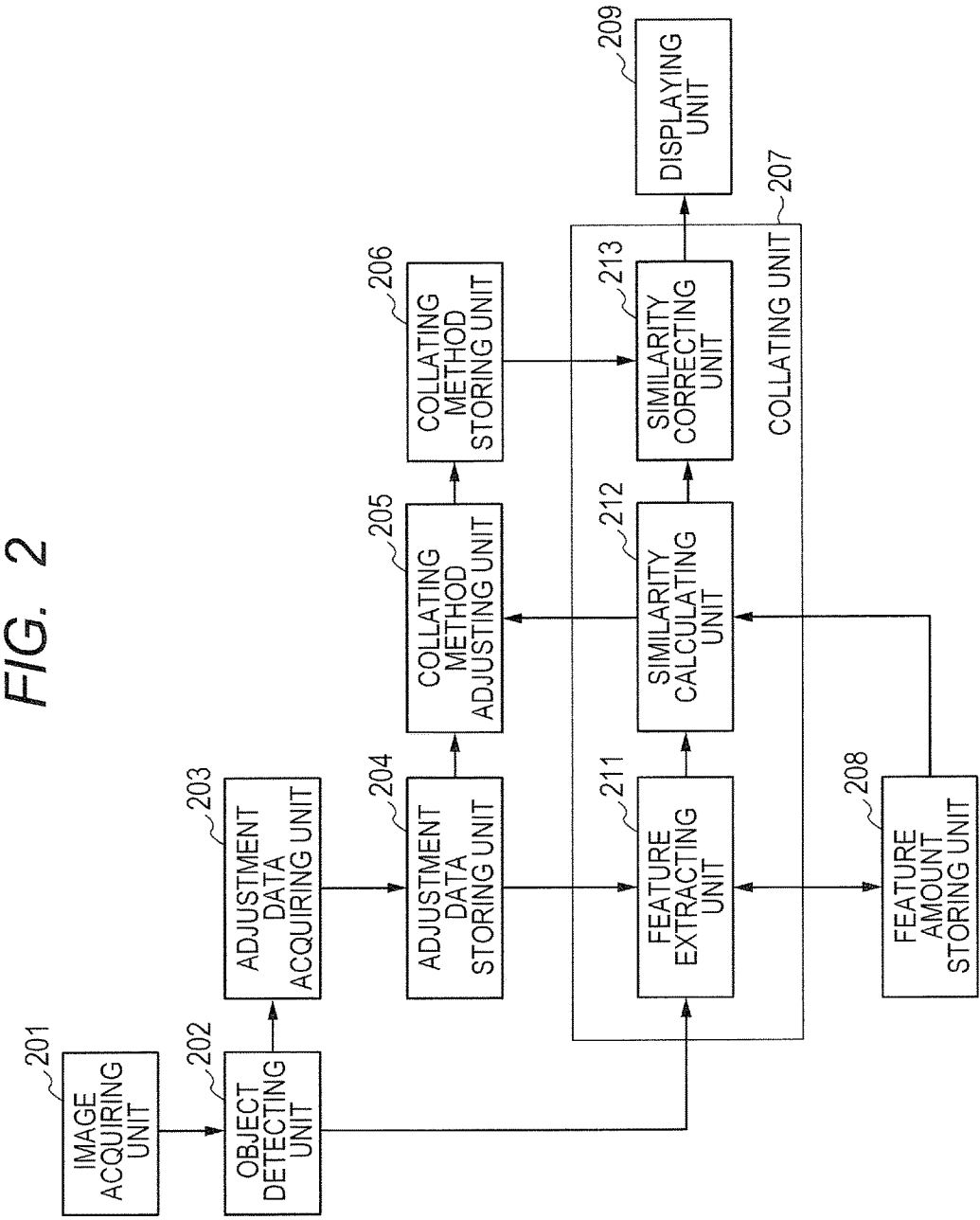
FIG. 2 is a block diagram for illustrating an example of the functional constitution of an image retrieving apparatus.

FIG. 2 is the block diagram for illustrating an example of the functional constitution of the image retrieving apparatus 101. That is, the image retrieving apparatus 101 according to the present embodiment comprises an image acquiring unit 201, an object detecting unit 202, an adjustment data acquiring unit 203, an adjustment data storing unit 204, a collating method adjusting unit 205, a collating method storing unit 206, a collating unit 207, a feature amount storing unit 208 and a displaying unit 209.

The image acquiring unit 201 acquires an image from each of the cameras 102 to 104 via the communicating device 115, and outputs the acquired image to the object detecting unit 202. Here, it may be possible for the image acquiring unit 201 to acquire an image from the secondary storing device 114 and output the acquired image to the object detecting unit 202.

The object detecting unit 202 detects the face of a person (person face) in the image acquired from the image acquiring unit 201, and outputs coordinate information of the image and the face, i.e. face image data, to the adjustment data acquiring unit 203 or a feature extracting unit 211.

The adjustment data acquiring unit 203 acquires adjustment data for adjusting the collating process, based on the coordinate information of the image and the face output from the object detecting unit 202, and outputs the acquired adjustment data to the adjustment data storing unit 204. Here, it should be noted that the adjustment data is data which is used to adjust the collating process which is used for the image collating process by the image retrieving apparatus 101.

The adjustment data storing unit 204 stores the adjustment data acquired from the adjustment data acquiring unit 203, in the secondary storing device 114. Moreover, the adjustment data storing unit 204 outputs the stored adjustment data to the collating method adjusting unit 205. It should be noted that, more specifically, the adjustment data indicates the images of a plurality of objects photographed and included in the same image, that is, the face images of the plurality of persons photographed in the same image.

The collating method adjusting unit 205 adjusts the collating process based on the adjustment data acquired from the adjustment data storing unit 204, and generates collating method data in which the adjusted collating process, parameters related to the adjusted collating process, and the like are described. Then, the collating method adjusting unit 205 outputs the generated collating method data to the collating method storing unit 206.

The collating method storing unit 206 stores the collating method data acquired from the collating method adjusting unit 205, in the secondary storing device 114. Moreover, the collating method storing unit 206 outputs the stored collating method data to the collating unit 207.

The collating unit 207 is a collating unit which mutually collates the objects respectively photographed in the two images being the collation target. The collating unit 207 collates the face image data acquired from the object detecting unit 202 and a feature amount acquired from the feature amount storing unit 208 with each other, by using the collating method data acquired from the collating method storing unit 206. Then, the collating unit 207 outputs a collation result to the displaying unit 209. Moreover, the collating unit 207 calculates the feature amount from the face image data acquired from the object detecting unit 202, and outputs the calculated feature amount to the feature amount storing unit 208. In the present embodiment, the image retrieving apparatus 101 adjusts the collating process to be performed by the collating unit 207.

The feature amount storing unit 208 stores the feature amount acquired from the collating unit 207, in the secondary storing device 114. Moreover, the feature amount storing unit 208 outputs the stored feature amount to the collating unit 207.

The displaying unit 209 displays the collation result and the image data corresponding to the collation result acquired from the collating unit 207, on the video image outputting device 116.

The collating unit 207 will be described in detail. The collating unit 207 comprises the feature extracting unit 211, a similarity calculating unit 212 and a similarity correcting unit 213.

The feature extracting unit 211 extracts the feature amount based on the face image data acquired from the object detecting unit 202. Moreover, the feature extracting unit 211 outputs the extracted feature amount to the feature amount storing unit 208 or the similarity calculating unit 212.

The similarity calculating unit 212 calculates a degree of similarity between the feature amount acquired from the feature amount storing unit 208 and the feature amount acquired from the feature extracting unit 211. Moreover, the similarity calculating unit 212 outputs the calculated degree of similarity to the similarity correcting unit 213.

The similarity correcting unit 213 corrects the degree of similarity acquired form the similarity calculating unit 212, based on the collating method data acquired from the collating method storing unit 206. Moreover, the similarity correcting unit outputs the corrected degree of similarity to the displaying unit 209.

(Entire Process)

The process to be performed in the present embodiment includes an adjusting process of automatically adjusting the collating process for each of the plurality of cameras, and a monitoring/retrieving process of retrieving a specific person by photographing and accumulating video images (or images) with use of the cameras 102 to 104 and collating them with others according to a user's instruction.

Incidentally, it is assumed that, at the start of the process in the present embodiment, the cameras 102 to 104 have already been installed respectively at different places and the image retrieving apparatus 101 is in a state capable of starting the process immediately.

(Monitoring/Retrieving Process)

Initially, the monitoring/retrieving process according to the present embodiment will be described. FIG. is the flow chart for describing an example of the monitoring/retrieving process of the image retrieving apparatus 101. The process in which the image retrieving apparatus 101 according to the present embodiment retrieves the specific person by collating the image data with others according to the user's instruction, while photographing the image data of persons with use of the cameras 102 to 104, will be described with reference to FIG. 3.

Incidentally, it is assumed that, while the image retrieving apparatus 101 is performing the monitoring/retrieving process, the cameras 102 to 104 continue to perform the photographing and transmit the image data photographed and captured to the image retrieving apparatus 101, and the CPU 111 continues to store the transmitted image data in the secondary storing device 114.

In S301, the image acquiring unit 201 acquires the image data from the secondary storing device 114.

In S302, the object detecting unit 202 detects the object, i.e., the person face, from the image data. As the result of the detecting process in S302, the object detecting unit 202 outputs, e.g., the coordinate information of the face in the image data. The object detecting unit 202 only has to use a known technique as the method of detecting the person face. For example, it is possible for the object detecting unit 202 to use the technique disclosed in P. Viola and Ml Jones, "Robust real-time face detection", in page II: 747, 2001.

In S303, the object detecting unit 202 decides whether or not one or more objects have been detected in S302. Then, when the object detecting unit 202 decides that one or more objects have been detected in S302, the process is advanced to S304. On the other hand, when the object detecting unit 202 decides that one or more objects are not detected in S302, the process is advanced to S308.

In S304, the feature extracting unit 211 of the collating unit 207 extracts the feature amount from the face image data detected in S302. The feature extracting unit 211 only has to use a known technique as the method of extracting the feature amount. For example, it is possible for the feature extracting unit 211 to extract an LBP (Local Binary Pattern) feature amount from the face image data detected in S302. Besides, it may be possible for the feature extracting unit 211 to extract an HOG (Histogram of Oriented Gradient) feature amount from the face image data detected in S302.

Besides, it may be possible for the feature extracting unit 211 to extract an SIFT (Scale-Invariant Feature Transform) feature amount from the face image data detected in S302. Besides, it may be possible for the feature extracting unit 211 to extract a feature amount obtained by mixing the above feature amounts from the face image data detected in S302.

In S305, the feature amount storing unit 208 stores the feature amount extracted in S304, in the secondary storing device 114 or the like.

In S306, the collating unit 207 decides whether or not an image retrieval instruction issued based on a user's operation via a retrieval instruction input screen displayed by the displaying unit 209 on the video image outputting device 116 and an operation inputting device is detected. Here, the retrieval instruction input screen displayed by the displaying unit 209 on the video image outputting device 116 is, for example, a screen which includes an instruction button and the like for inputting the retrieval instruction. Namely, the collating unit 207 detects the selection of the instruction button on the retrieval instruction input screen. When the collating unit 207 decides that the image retrieval instruction is detected, the process is advanced to S307. On the other hand, when the collating unit decides that the image retrieval instruction is not detected, the process is advanced to S308.

Figure 4:
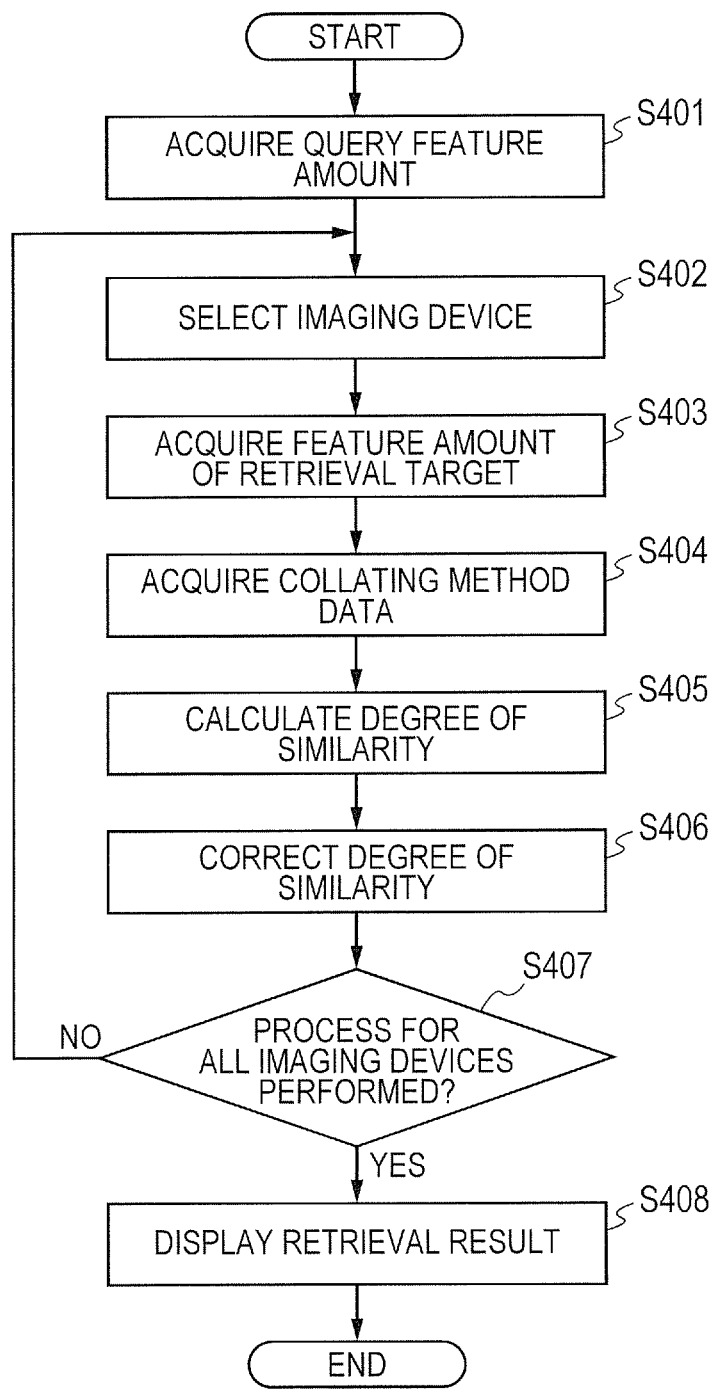
FIG. 4 is a flow chart for describing an example of an image retrieving process of the image retrieving apparatus.

In S307, the collating unit 207 performs an image retrieving process. FIG. 4 is a flow chart for describing an example of the image retrieving process of the image retrieving apparatus 101. Hereinafter, the process in S307 will be described in detail with reference to FIG. 4.

In S401, the similarity calculating unit 212 acquires a query feature amount. Here, the query feature amount is the feature amount extracted from the person face. In the present embodiment, in S401, the similarity calculating unit 212 acquires, as the query feature amount, the feature amount previously acquired from the image of the person face being the retrieval target. The feature amount storing unit 208 has previously stored the query feature amount in the secondary storing device 114. The similarity calculating unit 212 acquires the stored query feature amount from the secondary storing device 114. Also, it may be possible for the similarity calculating unit 212 to photograph the image by using the camera, capture the image data from the photographed image, detect the face from the captured image data, and extract the query feature amount from the detected face. Besides, it may be possible for the similarity calculating unit 212 to acquire either a single query amount or a plurality of query feature amounts.

In S402, the similarity calculating unit 212 selects the camera. For example, the similarity calculating unit 212 selects one of the plurality of cameras in preset order.

In S403, the similarity calculating unit 212 acquires, from the secondary storing device 114, the feature amount which was extracted in S304 based on the image photographed by the camera selected in S402 and has been stored by the feature amount storing unit 208 in the secondary storing device 114 in S305.

In S404, the collating unit 207 acquires, from the secondary storing device 114, the collating method data stored by the collating method storing unit 206 in the secondary storing device 114.

In the present embodiment, after the degree of similarity was calculated, the collating unit 207 acquires a correction value for correcting the degree of similarity for each camera as the collating method data. Here, it is assumed that the acquired collating method data has been set in the previous adjusting process. The adjusting process will be described later with reference to FIG. 7 and the like.

In S405, the similarity calculating unit 212 calculates the degree of similarity between the query feature amount acquired in S401 and the feature amount of the retrieval target acquired in S403, by using the collating method data acquired in S404. That is, the similarity calculating unit 212 calculates the degree of similarity between the feature amounts. The similarity calculating unit 212 only has to use a known technique as the method of calculating the degree of similarity. For example, it may be possible for the similarity calculating unit 212 to use correlation or another distance scale as the method of calculating the degree of similarity.

In S406, the similarity correcting unit 213 adds the correction value acquired as the collating method data in S404 to the degree of similarity calculated in S405. That is, the degree of similarity finally calculated by the process in S405 to S406 is expressed by the following expression (1).

$$S = \frac{A \cdot B}{|A||B|} + \alpha_i \qquad (1)$$

Here, each of the symbols A and B in the expression (1), which indicates the query feature amount, is the element of $R^R$ (a D-dimensional vector of real number). The symbol D indicates the dimension number. The symbol $\alpha_i$ in the expression (1) indicates the correction value previously set for a camera i. When there are the plurality of query feature amounts, the the similarity calculating unit 212 and the similarity correcting unit 213 calculate the degrees of similarity for each of all the combinations of the query feature amounts and the feature amount of the retrieval target. Moreover, after calculating the degree of similarity indicated by the expression (1), the similarity correcting unit 213 performs a normalizing process such that the calculated degree of similarity falls within a set range. In the present embodiment, the similarity correcting unit 213 normalizes the degree of similarity so as to fall within the range of 0 to 1000.

In S407, the collating unit 207 decides whether or not the process in S402 to S406 has been performed for all the cameras connected to the image retrieving apparatus 101. When the collating unit 207 decides that the process in S402 to S406 has been performed for all the cameras connected to the image retrieving apparatus 101, the process is advanced to S408. On the other hand, when the collating unit 207 decides that the process in S402 to S406 is not performed for all the cameras connected to the image retrieving apparatus 101, the process is returned to S402.

In S408, the displaying unit 209 displays the retrieval result on the video image outputting device 116. The displaying unit 209 compares the degree of similarity, calculated in S405 to S406, between the face data of the set person and the face data of the person of the image photographed by each of the cameras 102 to 104, with a set threshold. When the degree of similarity calculated in S405 to S406 is higher than the set threshold, the collating unit 207 decides that the person photographed in the image corresponding to the degree of similarity calculated in S405 to S406 is the same person as the person being the retrieval target.

Figures 5, 6:
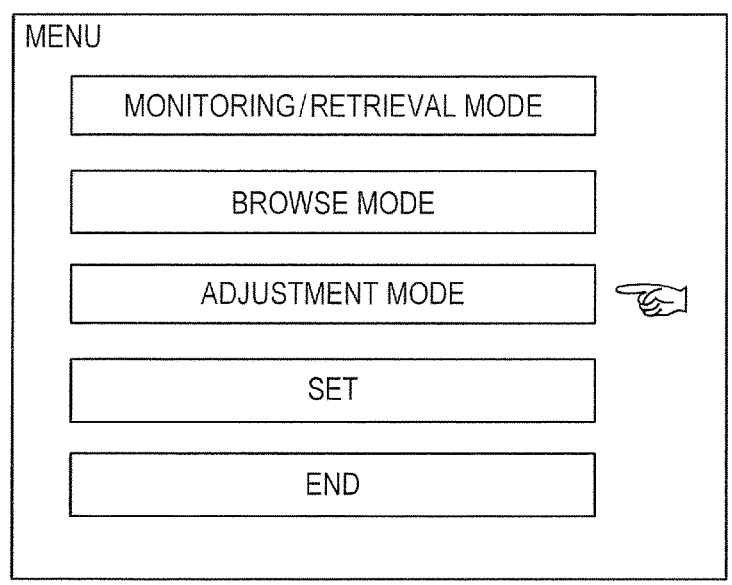
FIG. 5 is a diagram for illustrating an example of the content displayed as a retrieval result.
FIG. 6 is a diagram for illustrating an example of the content to be displayed when an adjusting process is performed.

FIG. 5 is a diagram for illustrating an example of the content which is displayed as the retrieval result. The left side of a retrieval result display screen illustrated includes the face image data of the query feature amount given as a retrieval query, whereas the right side of the retrieval result display screen includes the face image data of the retrieval result. The displaying unit 209 displays, as the retrieval result, only the image having the degree of similarity equal to or higher than the set threshold. In the present embodiment, the displaying unit 209 displays only the image having the degree of similarity equal to or higher than 600 being the set threshold. In this case, the displaying unit 209 does not display the retrieval result lower than the degree of similarity of 600. The displaying unit 209 displays the face image data and the degrees of similarity being the retrieval result in descending order of the degree of similarity, and also displays a camera number of each of the used cameras and the time when each of the face image data was photographed and captured. By such a display of the displaying unit 209, it is possible to achieve the person retrieval for retrieving when and by which camera the person corresponding to the face image input as the retrieval query was photographed.

Figure 3:
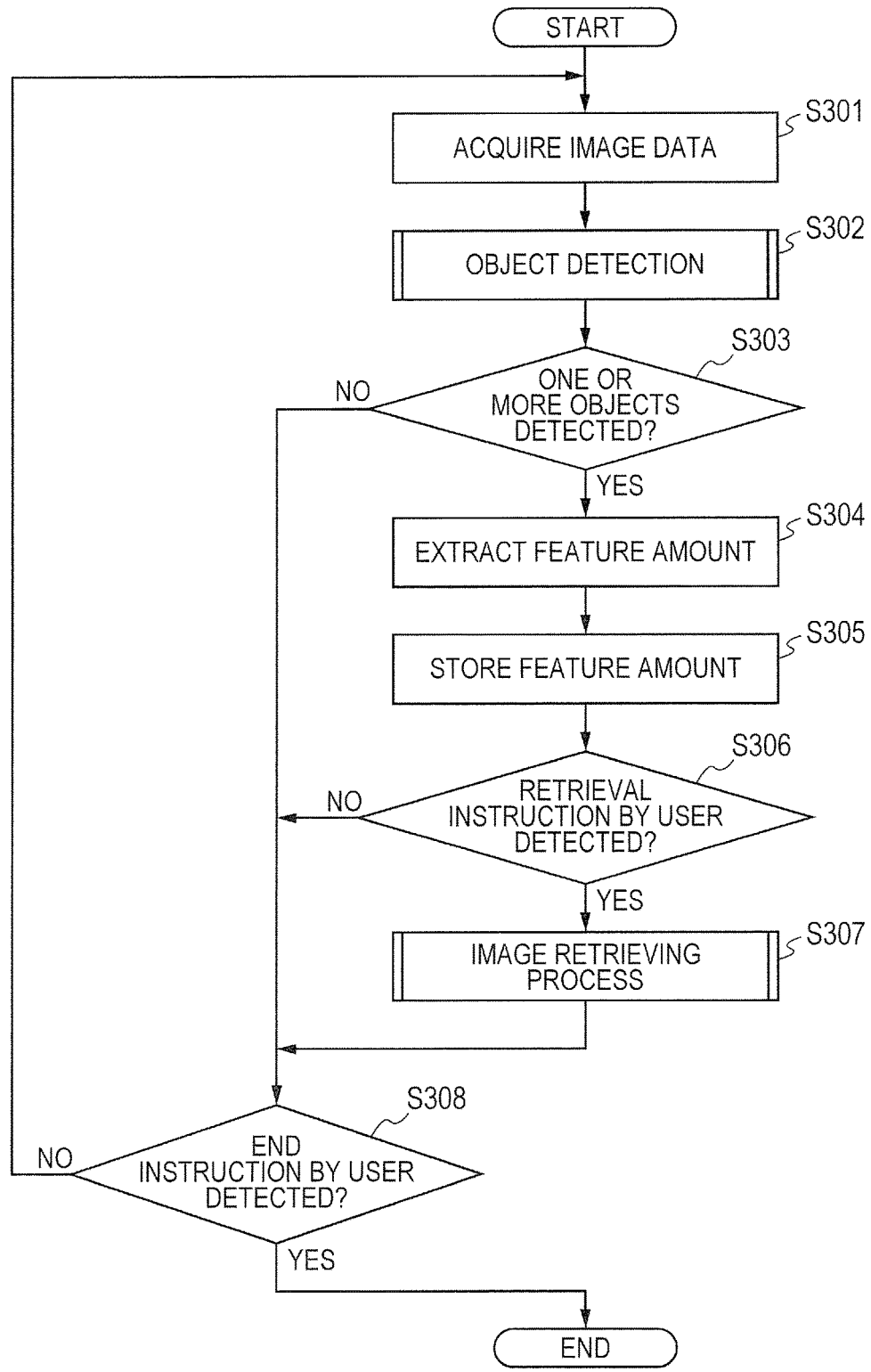
FIG. 3 is a flow chart for describing an example of a monitoring/retrieving process of the image retrieving apparatus.

It returns to the description of the process of the flow chart illustrated in FIG. 3.

In S308, the collating unit 207 decides whether or not an end instruction for ending the process of FIG. 3 based on the user's operation via an end instruction input screen displayed on the video image outputting device 116 and the operation inputting device 117 is detected. When the collating unit 207 decides that the end instruction for ending the process of FIG. 3 is detected, the process of FIG. 3 is ended. On the other hand, when the collating unit decides that the end instruction for ending the process of FIG. 3 is not detected, the process is returned to S301.

As long as there is no retrieval instruction by the user and there is no end instruction by the user, the image retrieving apparatus 101 repeatedly performs the process of acquiring the image data, and extracting and storing the feature amount. Thus, the image retrieving apparatus 101 acquires and accumulates the features amounts of the retrieval-target faces from the photographed and captured video images.

(Adjusting Process)

Hereinafter, the adjusting process which is performed by the image retrieving apparatus 101 according to the present embodiment for automatically adjusting the collating process for each of the cameras 102 to 104 will be described.

FIG. 6 is a diagram for illustrating an example of the content to be displayed when the adjusting process is performed. In the adjusting process, the displaying unit 209 displays such a console screen as illustrated in FIG. 6 on the video image outputting device 116. More specifically, the displaying unit 209 displays, on the console screen, menu buttons to be used for selecting what kind of process should be instructed to the image retrieving apparatus 101. Usually, since a monitoring/retrieval mode is being selected, the image retrieving apparatus 101 performs the above monitoring/retrieving process as described in FIG. 3 and the like. When it is detected based on a user's operation that the button corresponding to an adjustment mode on the console screen of FIG. 6 is selected, the image retrieving apparatus 101 performs the adjusting process.

Figure 7:
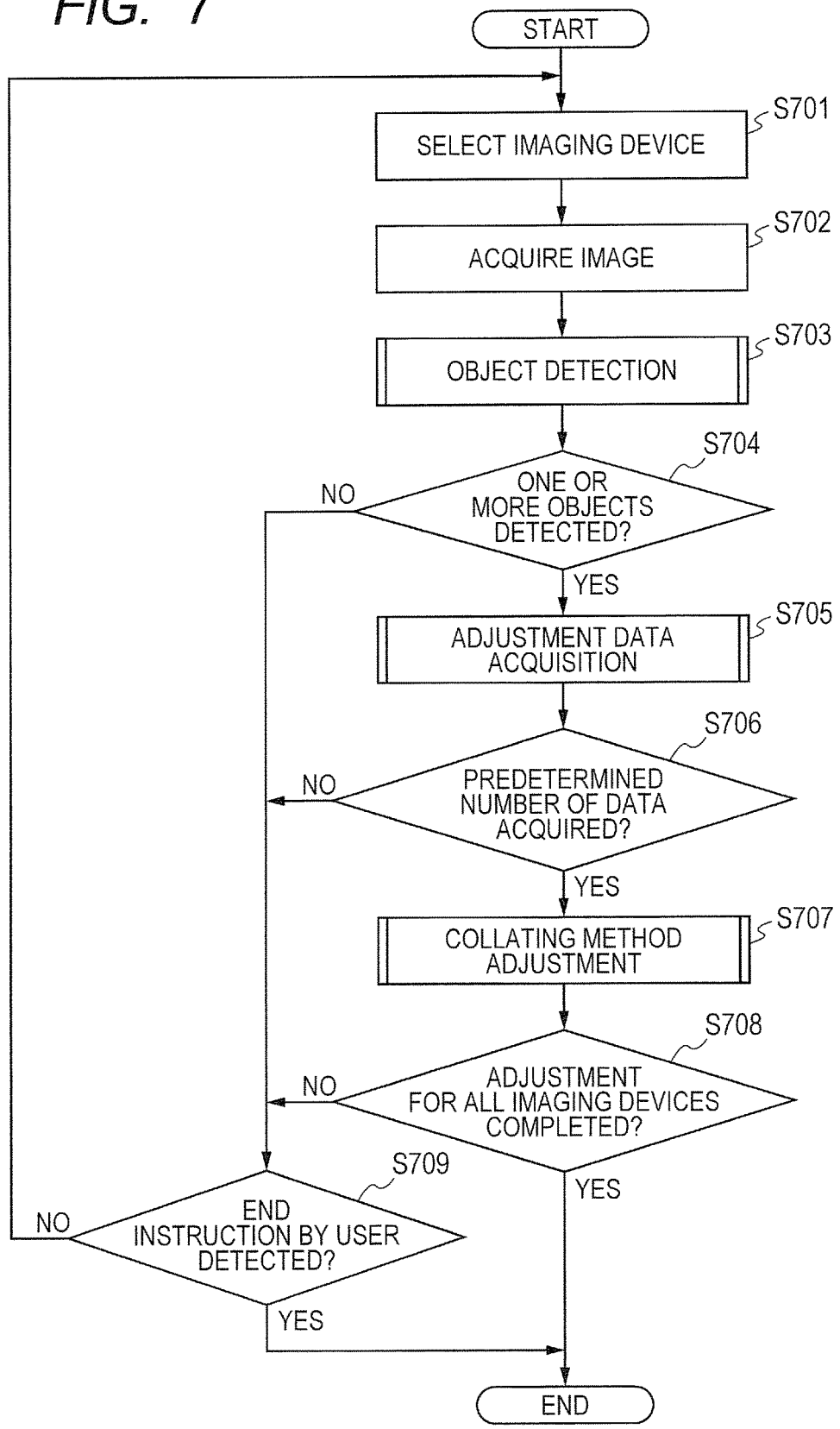
FIG. 7 is a flow chart for illustrating an example of a process of adjusting a collating process.

FIG. 7 is a flow chart for illustrating an example of the process of adjusting the collating process by the image retrieving apparatus 101. The process of adjusting the collating process will be described in detail with reference to FIG. 7.

From beginning to end of the process of the flow chart illustrated in FIG. 7, it is assumed that each of the cameras 102 to 104 continues to photograph images at a set frame rate and transmit the photographed images to the image retrieving apparatus 101, and the CPU 111 continues to store the received images in the secondary storing device 114. At that time, the CPU 111 associates photographing information indicating that the received image was photographed by which camera and settled at what order of a frame with captured image data, and then stores it in the secondary storing device 114.

In S701, the image acquiring unit 201 selects, from cameras being the targets of the adjusting process, a camera for which the adjustment of the collating process is not completed. In the present embodiment, the cameras being the targets of the adjusting process are the cameras 102 to 104 respectively connected to the image retrieving apparatus 101.

In S702, the image acquiring unit 201 acquires, from the secondary storing device 114, the image which was photographed by the camera selected in S701 and has been stored in the secondary storing device 114. The image acquiring unit 201 grasps by which camera the image data stored in the secondary storing device 114 was photographed, by referring to the photographing information associated with the relevant image data and stored in the secondary storing device 114. In the present embodiment, the image acquiring unit 201 acquires the image (image data) stored in the secondary storing device 114. However, it may be possible to directly acquire the image data from the camera selected in S701.

In S703, the object detecting unit 202 detects the person face (object) from the image data acquired in S702. Here, the method of detecting the person face is the same as that used in S302.

In S704, the object detecting unit 202 decides whether or not one or more person faces have been detected in S703. When the object detecting unit 202 decides that the one or more person faces have been detected in S703, the process is advanced to S705. On the other hand, when the object detecting unit decides that any person face is not detected in S703, the process is advanced to S709.

Figure 8:
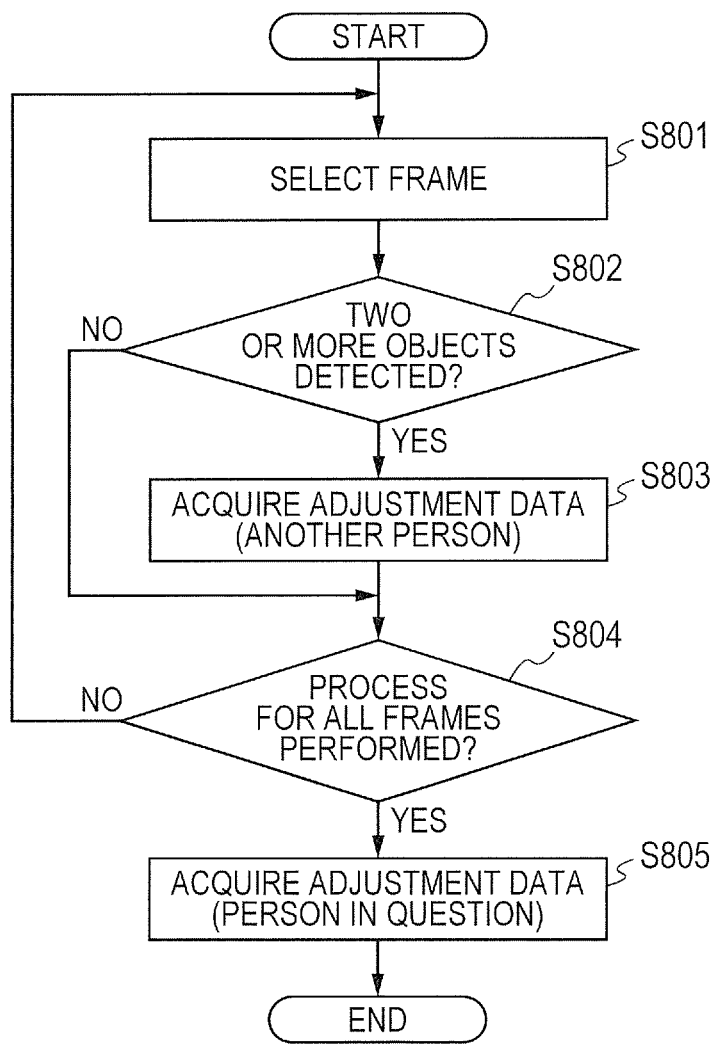
FIG. 8 is a flow chart for illustrating an example of an adjustment data acquiring process.
Figure 9:
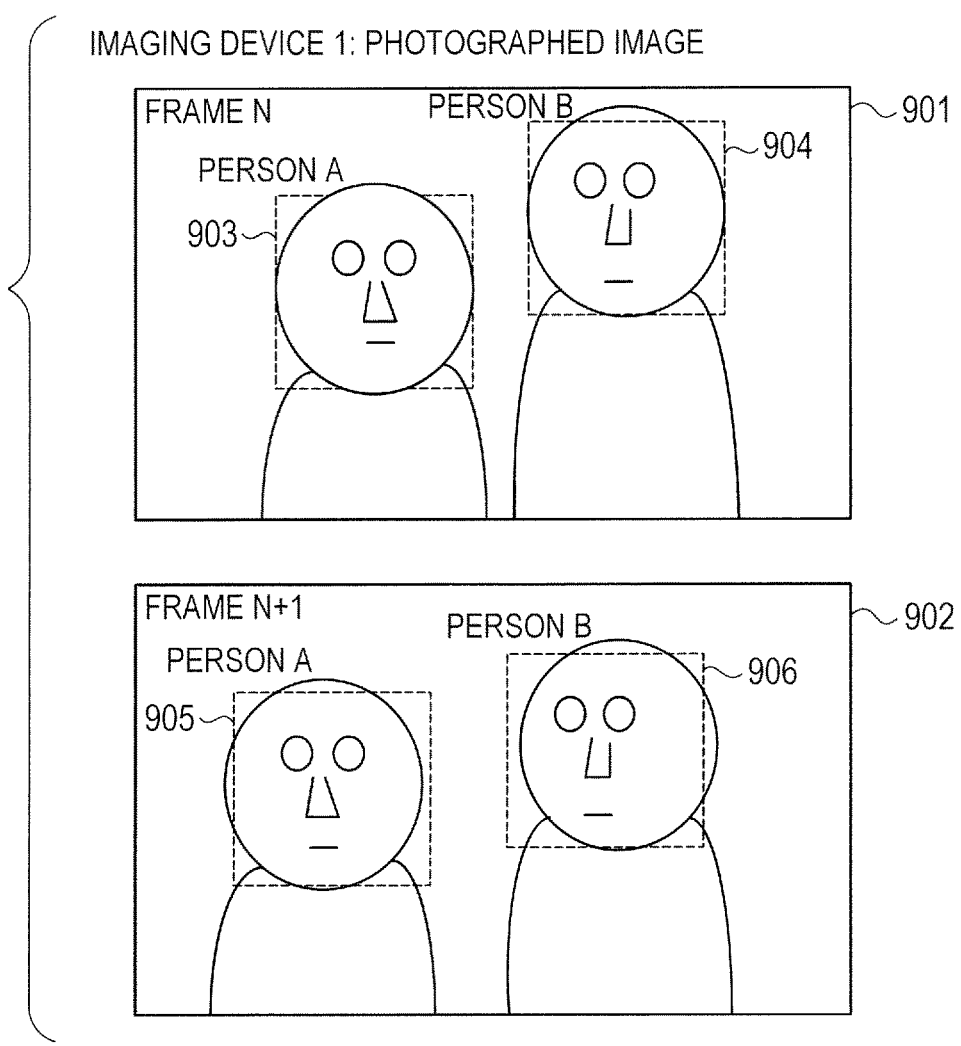
FIG. 9 is a set of diagrams for describing an example of the adjustment data acquiring process.

In S705, the adjustment data acquiring unit 203 acquires the adjustment data. FIG. 8 is a flow chart for illustrating an example of the adjustment data acquiring process of the image retrieving apparatus. FIG. 9 is a set of diagrams for describing an example of the adjustment data acquiring process. Hereinafter, the adjustment data acquiring process will be described in detail with reference to FIGS. 8 and 9.

In S801, the adjustment data acquiring unit 203 selects one frame from the plurality of image data acquired in S702. Then, the adjustment data acquiring unit 203 performs a process in S801 to S803 for each of the images acquired in S702.

FIG. 9 is the set of the diagrams for describing the example of the adjustment data acquiring process. Image data 901 of a frame N and image data 902 of a frame N+1 respectively illustrated in FIG. 9 represent the images photographed by the camera selected in S701. More specifically, the image data 902 of the frame N+1 indicates the image photographed subsequent to the image corresponding to the image data 901 of the frame N. In the present embodiment, the image acquired in S702 includes the image data 901 of the frame N and the image data 902 of the frame N+1. Therefore, the adjustment data acquiring unit 203 selects, in S801, one frame from the plurality of the image data including the image data 901 and 902. Face region images 903 and 904 illustrated in FIG. 9 correspond to the image data of the person face detected with respect to the image data 901 in S703, and face region images 905 and 906 illustrated in FIG. 9 correspond to the image data of the person face detected with respect to the image data 902 in S703.

In S802, the adjustment data acquiring unit 203 decides whether or not two or more person faces are detected in S703 with respect to the image data selected in S801. When the adjustment data acquiring unit 203 decides that two or more person faces are detected in S703 with respect to the image data selected in S801, the process is advanced to S803. On the other hand, when the adjustment data acquiring unit 203 decides that two or more person faces are not detected in S703 with respect to the image data selected in S801, the process is advanced to S804.

In S803, the adjustment data acquiring unit 203 acquires the adjustment data from the image of the frame selected in S801. Here, the persons in the same image in which the plurality of persons (objects) have been photographed and shown are mutually other persons or strangers (i.e., the persons who are not the same person (person in question or subject person)). The adjustment data acquiring unit 203 acquires, as the adjustment data, the face images of the plurality of persons photographed in the image data of the frame selected in S801. In the present embodiment, the adjustment data acquiring unit 203 acquires, as other-person adjustment data, a pair of the mutual face images of the persons photographed and captured in the image data of the frame selected in S801. Here, the other-person adjustment data is the adjustment data which represents the pair of the mutual face images of other persons who are mutually different from each other. The pair of the mutual face images of other persons who are mutually different from each other is an example of an image group of different objects.

That is, when the frame N of FIG. 9 is selected in S801, the adjustment data acquiring unit 203 acquires the pair of the face region image 903 and the face region image 904 of FIG. 9 as the other-person adjustment data. Since the plurality of persons photographed and included in the same image data simultaneously can be assumed to be mutually other persons, it is possible to acquire the other-person adjustment data without deciding whether the person in the image data is the person in question or the other person (stranger). Further, it is possible to assume that the persons photographed and included in the same image were photographed in the approximately same photographing condition. For this reason, it is possible for the adjustment data acquiring unit 203 to acquire the data representing other persons who were photographed in the same photographing condition.

In S804, the adjustment data acquiring unit 203 decides whether or not the process in S801 to S803 has been performed for all the images acquired in S702. When the adjustment data acquiring unit 203 decides that the process in S801 to S803 has been performed for all the images acquired in S702, the process is advanced to S805. On the other hand, when the adjustment data acquiring unit 203 decides that, in the images acquired in S702, there is a frame for which the process in S801 to S803 is not performed, the process is returned to S801. After the adjustment data acquiring unit 203 performed the process in S801 to S803 for the frame N, since the the process in S801 to S803 for the frame N+1 is not yet performed, the process is returned to S801 as the result of the process in S804. Then, the adjustment data acquiring unit 203 performs the process in S801 to S803 for the frame N+1.

In S805, the adjustment data acquiring unit 203 acquires the adjustment data from the plurality of different images acquired in S702. That is, the adjustment data acquiring unit 203 acquires in S805 the adjustment data different from that acquired in S803. More specifically, the adjustment data acquiring unit 203 acquires a pair of the images of the same person (object). In the following description, it is assumed that the adjustment data being the pair of the image data of the person in question is person-in-question adjustment data. The pair of the images of the same person is an example of an image group of the same object.

For example, the adjustment data acquiring unit 203 acquires, as the person-in-question adjustment data, the pair of the face region image 903 and the face region image 905 and the pair of the face region image 904 and the face region image 906 from the image data 901 and the image data 902 of FIG. 9. That is, the adjustment data acquiring unit 203 acquires the person-in-question adjustment data by acquiring the images of the same person respectively from the plurality of image data, and making the pair of the acquired images. Since it is impossible for the adjustment data acquiring unit 203 to know in advance who each of the face regions corresponds to, it is necessary to associate the face regions by the different image data (e.g., the image data of the frame N and the image data of the frame N+1), in order to acquire the pair of the face region images of the person in question. It is possible for the adjustment data acquiring unit 203 to associate the face regions by using an object tracking technique for each frame. For example, it is possible for the adjustment data acquiring unit 203 to use the technique proposed in Japanese Patent Application Laid-Open No. 2009-510541.

Moreover, it may be possible for the adjustment data acquiring unit 203 to decide whether the target image indicates the person in question, by collating the face images with each other.

The other-person adjustment data acquired in S803 and the person-in-question adjustment data acquired in S805 together constitute the adjustment data in the present embodiment. The adjustment data storing unit 204 stores the adjustment data in the secondary storing device 114.

Besides, it may be possible for the adjustment data acquiring unit 203 to use only the other-person adjustment data when adjusting the collating process, without performing the process in S805. In this connection, it may be possible for the secondary storing device 114 to previously store information indicating whether or not to use the person-in-question adjustment data when adjusting the collating process. In this case, the adjustment data acquiring unit 203 decides whether or not to use the person-in-question adjustment data when adjusting the collating process, by referring, from the secondary storing device, to the information indicating whether or not to use the person-in-question adjustment data in the adjustment of the collating process. Besides, it may be possible for the CPU 111 to change the content of the information stored in the secondary storing device 114 and indicating whether or not to use the person-in-question adjustment data when adjusting the collating process, based on a user's operation via the operation inputting device 117.

The above is the description of the adjustment data acquiring process.

It returns to the description of the process of the flow chart illustrated in FIG. 7.

In S706, the adjustment data acquiring unit 203 decides whether or not the number of the adjustment data acquired in S705 is larger than a set threshold (or whether or not a predetermined number of adjustment data have been acquired). When the adjustment data acquiring unit 203 decides that the number of the adjustment data acquired in S705 is larger than the threshold, the process is advanced to S707. On the other hand, when the adjustment data acquiring unit 203 decides that the number of the adjustment data acquired in S705 is equal to or smaller than the threshold, the process is advanced to S709. Besides, when it is decided that the number of the adjustment data acquired in S705 is equal to or smaller than the threshold, it may be possible for the displaying unit 209 to display, on the video image outputting device 116, an object indicating how much the adjustment data is hereafter required to make the number of the adjustment data higher than the set threshold.

In S707, the collating method adjusting unit 205 adjusts the collating process to the image data photographed and captured by the camera selected in S701. The process of adjusting the collating process will be described in detail with reference to FIG. 10.

Figure 10:
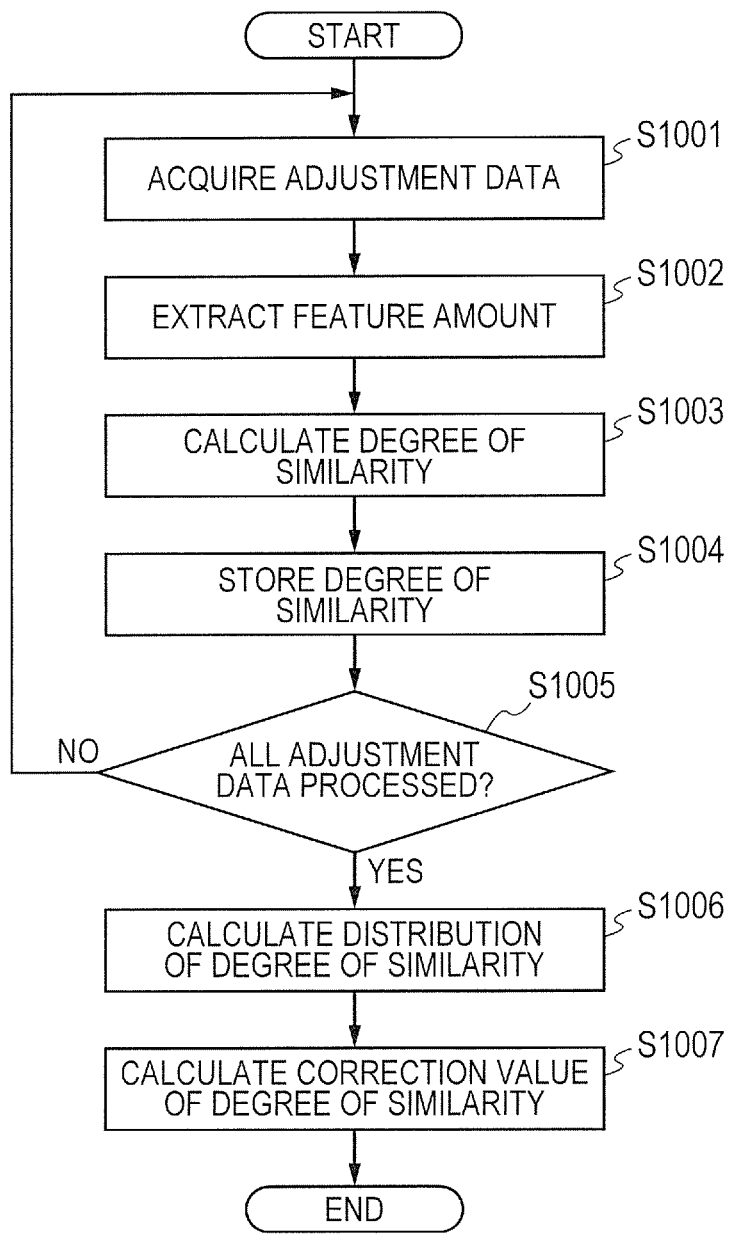
FIG. 10 is a flow chart for illustrating an example of the process of adjusting the collating process.

FIG. 10 is the flow chart for illustrating an example of the process of adjusting the collating process by the image retrieving apparatus 101.

In S1001, the collating method adjusting unit 205 acquires one piece of the adjustment data stored in the secondary storing device 114 by the adjustment data storing unit 204 in S705. Here, it may be possible for the collating method adjusting unit 205 to acquire the plurality of adjustment data in a lump. Besides, it may be possible for the collating method adjusting unit 205 to separately acquire the person-in-question adjustment data and the other-person adjustment data respectively. Besides, it may be possible for the collating method adjusting unit 205 to acquire only the other-person adjustment data and not to use the person-in-question adjustment data in the adjustment of the collating process.

In S1002, the collating method adjusting unit 205 extracts a pair of the feature amounts from the adjustment data, i.e., the pair of the face image data, acquired in S1001. Here, the method of extracting the feature amount in S1002 is the same as the method of extracting the feature amount in S304.

In S1003, the collating method adjusting unit 205 calculates a degree of similarity of the pair of the feature amounts extracted in S1002. Here, the method of calculating the degree of similarity in S1003 is the same as the method of calculating the degree of similarity in S405. However, since the correction value $\alpha_i$ is not yet set, the collating method adjusting unit 205 calculates the degree of similarity by using $\alpha_i=0$ as the default value in the expression (1).

In S1004, the collating method adjusting unit 205 stores the degree of similarity calculated in S1003 in the secondary storing device 114. The collating method adjusting unit 205 associates the information indicating whether the degree of similarity is calculated in S1003 from the person-in-question adjustment data or from the other-person adjustment data, with the calculated degree of similarity, and stores it in the secondary storing device 114.

In S1005, the collating method adjusting unit 205 decides whether or not the process in S1001 to S1004 has been performed for all the adjustment data stored in the secondary storing device 114 by the adjustment data storing unit 204 in S705. When the collating method adjusting unit 205 decides that the process in S1001 to S1004 has been performed for all the adjustment data stored in the secondary storing device 114 by the adjustment data storing unit 204, the process is advanced to S1006. On the other hand, when the collating method adjusting unit 205 decides that there is adjustment data for which the process in S1001 to S1004 is not yet performed in the adjustment data stored in the secondary storing device 114 by the adjustment data storing unit 204, the process is returned to S1001.

In S1006, the collating method adjusting unit 205 calculates a distribution of degree of similarity based on all the degrees of similarity calculated in S1003. The collating method adjusting unit 205 calculates the distribution of degree of similarity based on the degree of similarity acquired from the person-in-question adjustment data (hereinafter, this distribution will be called the person-in-question distribution of degree of similarity), and separately calculates the distribution of degree of similarity based on the degree of similarity acquired from the other-person adjustment data (hereinafter, this distribution will be called an other-person distribution of degree of similarity). The collating method adjusting unit 205 normalizes each of the person-in-question distribution of degree of similarity and the other-person distribution of degree of similarity such that the total sum thereof becomes 1. Moreover, it may be possible for the collating method adjusting unit 205 to calculate only the other person distribution of degree of similarity based on the degree of similarity acquired from the other-person adjustment data, and not to use the person-in-question adjustment data in the adjustment of the collating process.

Figure 11:
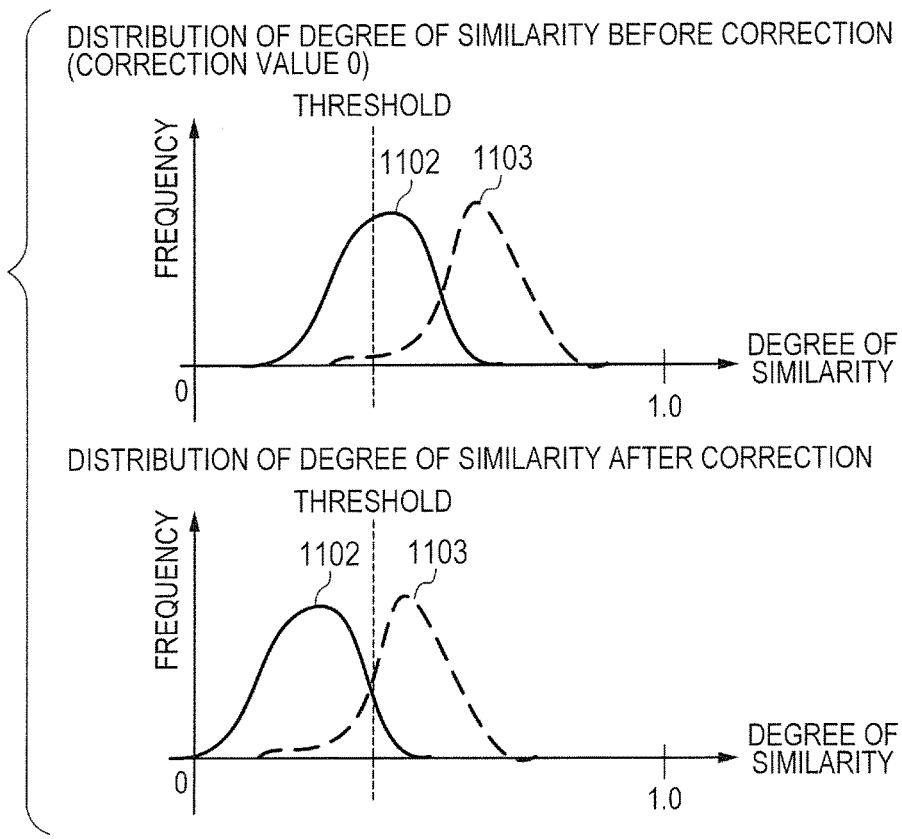
FIG. 11 is a set of graphs for describing an example of the process of adjusting the collating process.

In S1007, the collating method adjusting unit 205 calculates a correction value of the degree of similarity on the basis of the distribution of degree of similarity calculated in S1006. FIG. 11 is a set of graphs for describing an example of the process of adjusting the collating process by the image retrieving apparatus 101. In each of the graphs of FIG. 11, the vertical axis indicates the frequency of the degree of similarity, and the horizontal axis indicates the degree of similarity. In FIG. 11, there are two kinds of distributions of degree of similarity, i.e., a person-in-question distribution of degree of similarity 1102 and an other-person distribution of degree of similarity 1103. Moreover, in each of the graphs of FIG. 11, the threshold (the lower limit value by which the person in question is decided) described in S408 is indicated.

In the distribution of degree of similarity before correction illustrated in FIG. 11, since the degrees of similarity of the other persons are distributed at the place higher than the threshold, it can be understood that a possibility of occurrence of false acceptance increases. Here, the false acceptance is to erroneously decide the degree of similarity of other person as the person in question. Therefore, in the image collation, the collating method adjusting unit 205 adjusts the correction value, such that the false acceptance rate (corresponding to the area of the right region surrounded by the other-person distribution of degree of similarity 1103, the line of the threshold and the horizontal axis "the degree of similarity" shown in FIG. 11) becomes equal to or lower than a set threshold. That is, the collating method adjusting unit 205 adjusts the collating process, on the basis of the collation result which has been decided as the other persons in the other-person adjustment data. The collating method adjusting unit 205 acquires the false acceptance rate by the following expression (2).

$$P1 = \sum_{j>threshold} E_j \tag{2}$$

The symbol E in the expression (2) indicates the other-person distribution of degree of similarity, and the symbol j indicates the degree of similarity which has been quantized to a set discrete value. That is, the symbol $E_j$ in the expression (2) indicates an appearance frequency of the degree of similarity j, and the symbol "threshold" in the expression (2) indicates the set threshold. The symbol P1 indicates an appearance rate of the degree of similarity of the other-person face images larger than the set threshold, i.e., the false acceptance rate. When only the other-person adjustment data is used to adjust the collating process, the collating method adjusting unit 205 adjusts the correction value $\alpha_i$ such that the value of the appearance rate P1 becomes the value closest to a previously set target value. More specifically, the collating method adjusting unit 205 assumes the correction value $\alpha_i$ to be a predetermined value, calculates the distribution E, and calculates the appearance rate P1 based on the calculated distribution E. Then, the collating method adjusting unit 205 repeats the above calculations while changing the correction value and determines the correction value $\alpha_i$ at the time when the appearance rate P1 approaches most to the preset value, as the final correction value. By acquiring the correction value in this way, it is possible for the image retrieving apparatus 101 to suppress the probability that the other person (stranger) is erroneously decided as the person who should be retrieved, within a permissible range. Besides, it may be possible for the collating method adjusting unit 205 to acquire the correction value $\alpha_i$ by using other method.

Besides, when not only the other-person adjustment data but also the person-in-question adjustment data is used to adjust the collating process, the collating method adjusting unit 205 performs the following process. That is, the collating method adjusting unit 205 adjusts the correction value $\alpha_i$ such that the false acceptance rate at the time of the image collation falls within a set range and a false rejection rate at the time of the image collation falls within a set range. Here, the false rejection rate is a rate by which the person in question (or subject person) is erroneously rejected at the time of the collation.

The collating method adjusting unit 205 calculates the false rejection rate (corresponding to the area of the left region surrounded by the person-in-question distribution of degree of similarity 1102, the line of the threshold and the horizontal axis of "the degree of similarity" shown in FIG. 11), based on the following expression (3).

$$P2 = \sum_{k < threshold} E_k \quad (3)$$

The symbol E in the expression (3) indicates the person-in-question distribution of degree of similarity, and the symbol k indicates the degree of similarity which has been quantized to a set discrete value. That is, the symbol $E_k$ in the expression (3) indicates an appearance frequency of the degree of similarity k, and the symbol "threshold" in the expression (3) indicates the set threshold as well as the expression (2). The symbol P2 indicates an appearance rate of the degree of similarity of the person-in-question face images smaller than the set threshold, i.e., the false rejection rate.

More specifically, the collating method adjusting unit 205 repeatedly calculates the false acceptance rate P1 of the expression (2) and the false rejection rate P2 of the expression (3), while changing the correction value $\alpha_i$. Then, the collating method adjusting unit 205 determines, as the final correction value, the correction value $\alpha_i$ in the case where the calculated false acceptance rate P1 falls within the set range and the calculated false rejection rate P2 falls within a set range.

Moreover, it may be possible for the collating method adjusting unit 205 to determine the correction value $\alpha_i$ such that the false rejection rate approaches most to a set value. That is, it may be possible for the collating method adjusting unit 205 to adjust the collating process, on the basis of the collation result which has been decided as the other persons in the pairs of the images of the same object. In this case, the collating method adjusting unit adopts an adjusting method of calculating the false rejection rate P2 of the expression (3) while changing the correction value $\alpha_i$, thereby retrieving the value equivalent to the correction value $\alpha_i$ by which the value of the false rejection rate P2 becomes closest to the set value.

The distribution of degree of similarity after correction illustrated in FIG. 11 indicates an example which is acquired by respectively correcting the person-in-question distribution of degree of similarity and the other-person distribution of degree of similarity, based on the correction value adjusted by using only the other-person adjustment data. In FIG. 11, since the adjustment is performed so as to reduce the false acceptance (rate), the other-person distribution of degree of similarity is shifted leftward, so that it can be understood that the false acceptance has significantly decreased as compared with the case before the correction. As just described, it is possible for the image retrieving apparatus 101 to adjust the correction value in which the false acceptance and the false rejection have been controlled. Here, it is possible to arbitrarily determine how to set the false acceptance rate and/or the false rejection rate. More specifically, in the person retrieval, even if there are some false acceptance rates, there is a case where the false rejection rate is set as few as possible.

In the present embodiment, the reason for which the collating process is adjusted based on such adjustment data as the other-person adjustment data by which it is possible to assume that other persons are photographed in the same photographing condition will be described. In general, the degree of similarity between the images being different objects photographed in the same photographing condition tends to be higher than the degree of similarity between the images being different objects photographed respectively in the different photographing conditions. In the present embodiment, the other-person adjustment data is used. In other words, the adjustment is performed by using the data which indicate the other persons and have the high degree of similarity, that is, the data which are likely to accept another person easily. By using the adjustment data like this, it is possible to expect the adjustment in which the false acceptance is more accurately controlled as compared with a case of collecting the other-person adjustment data without discriminating whether or not the photographing condition is the same. Then, the collating method storing unit 206 stores the adjusted collating method data in the secondary storing device 114. Thus, it ends the description of the adjusting process in FIG. 10.

It returns to the description of the process of the flow chart illustrated in FIG. 7.

In S708, the collating method adjusting unit 205 decides whether or not the adjustment of the collating method has been completed for all of the cameras. Then, when the collating method adjusting unit 205 decides that the adjustment of the collating method has been completed for all of the cameras, the process of FIG. 7 is ended. On the other hand, when the collating method adjusting unit decides that the camera for which the adjustment of the collating process is not completed exists, the process is advanced to S709.

In S709, the collating method adjusting unit 205 decides whether or not an end instruction for ending the process of FIG. 7 based on the user's operation via the end instruction input screen displayed on the video image outputting device 116 and the operation inputting device 117 is detected. When the collating method adjusting unit 205 decides that the end instruction for ending the process of FIG. 7 is detected, the process of FIG. 7 is ended. On the other hand, when the collating method adjusting unit decides that the end instruction for ending the process of FIG. 7 is not detected, the process is returned to S701.

Basically, the collating method adjusting unit 205 completes the adjusting process when the adjustment is completed for all the cameras. However, it is possible to end the process on the way when the end instruction from the user is detected in S709. In this case, the collating method adjusting unit 205 sets the correction value $\alpha_i$ of the degree of similarity for each camera to the default value 0.

Figure 12:
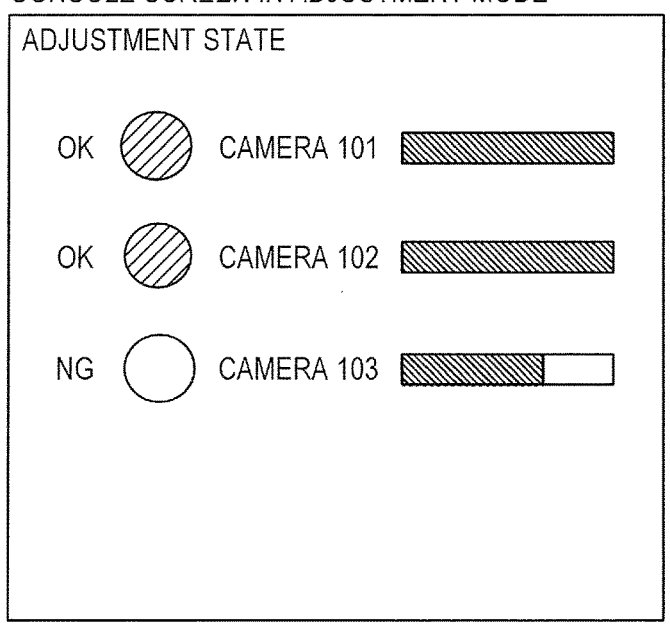
FIG. 12 is a diagram for describing an example of a console screen displayed in an adjustment mode.

FIG. 12 is a diagram for describing an example of the console screen which is displayed by the displaying unit 209 on the video image outputting device 116 in the adjusting process illustrated in FIG. 7. As illustrated in FIG. 12, the displaying unit 209 displays, on the video image outputting device 116, the character "OK" or "NG" indicating whether or not the adjustment has been completed for each camera, and the objects such as the buttons corresponding to "OK" and "NG". The video image outputting device 116 is an example of the outputting unit by which the console screen is output. Besides, the displaying unit 209 displays, on the console screen, a bar which indicates how much more the adjustment data is necessary for the camera 103 for which the adjustment is not yet completed. Moreover, it may be possible for the displaying unit 209 to display, on the console screen, another object such as a numeral, a figure or the like which indicates how much/many more the adjustment data is/are necessary for the camera 103 for which the adjustment is not yet completed. It is possible for the displaying unit 209 to enable a user to visually confirm the progress of the adjusting process, by displaying, on the console screen, the object which indicates how much more the adjustment data is necessary for the camera for which the adjustment is not yet completed. Thus, it is possible for the user to grasp which camera the adjustment is not yet ended, and how much more the adjustment data is necessary to end the adjustment, thereby improving user-friendliness.

The above is the description of the adjusting process.

As just described, in the present embodiment, the image retrieving apparatus 101 adjusts, based on the adjustment data acquired from the image data photographed and captured by the camera, the collating process used in the collation for the image photographed by the relevant camera. Thus, it is possible for the image retrieving apparatus 101 to achieve the person retrieval which is secure about the photographing condition. It is possible for the image retrieving apparatus 101 to reduce user's work and trouble of manually inputting correct data, by using, as the adjustment data, the assumption that the plurality of persons photographed and captured in the same image data are mutually other persons. In other words, it is possible for the image retrieving apparatus 101 to reduce the work and trouble for adjusting the collating process and thus improve user-friendliness. Moreover, it is possible for the image retrieving apparatus 101 to easily acquire the other-person adjustment data being the data of the other persons in the same photographing condition, by using the assumption that the photographing conditions for the plurality of persons photographed in the same image are the same. Thus, it is possible for the image retrieving apparatus 101 to more accurately adjust the collating process by the collating unit 207, so as to make the false acceptance rate an appropriate value as compared with the case where the adjustment data of the different photographing condition is used. Moreover, it is possible for the image retrieving apparatus 101 to adjust the collating process for each camera without detecting the photographing condition of each camera. Thus, it is possible to reduce the process as compared with the case where the photographing condition is detected and the collating process is adjusted based on the detected photographing condition.

Besides, although the image retrieving apparatus 101 calculates the correction value for the degree of similarity of the object image for each camera in the present embodiment, it may be possible to adjust the correction value for the threshold set for each camera.

In the case where the value acquired by adding the correction value to the degree of similarity of the two images to be collated is larger than the set threshold, the collating process that the objects photographed in the two images are collated to be the same is set as a first collating process. Besides, in the case where the degree of similarity of the two images to be collated is larger than the value acquired by adding the correction value to the set threshold, the collating process that the objects photographed in the two images are collated to be the same is set as a second collating process. The first collating process and the second collating process are an example of the collating process of collating the objects respectively photographed and captured in the two images by the following manner. In other words, the first collating process and the second collating process are an example of the collating process of performing the collation, by deciding whether or not the degree of similarity of the two images is the degree of similarity of the images of the same object, based on the relevant degree of similarity of the two images, the set threshold, and the correction value of the relevant degree of similarity or the threshold.

Moreover, although the image retrieving apparatus 101 adjusts the correction value $\alpha_i$ of the degree of similarity such that the false acceptance rate becomes the set rate in the present embodiment, another adjusting method is also adoptable. For example, it may be possible for the image retrieving apparatus 101 to adjust the correction value $\alpha_i$ of the degree of similarity such that a statistic (i.e., an average, a variance or the like) of the distribution of degree of similarity becomes a set target value. More specifically, the image retrieving apparatus 101 calculates an average p of a distribution of degree of similarity $E_j$ (or $E_k$) while changing the correction value $\alpha_i$. Then, the image retrieving apparatus 101 adopts the correction value $\alpha_i$ in the case where the value of the average $\mu$ is closest to the set target value. Besides, it may be possible for the image retrieving apparatus 101 to adjust the correction value $\alpha_i$ by another method.

Moreover, in the present embodiment, the image retrieving apparatus 101 adjusts the collating process of collating whether or not the person faces as the objects are the same. However, it may be possible to adjust a collating process of collating whether or not human bodies or the like as the objects are the same.

Second Embodiment

In the present embodiment, a method by which the image retrieving apparatus 101 adjusts a process of extracting a feature amount will be described.

It should be noted that the hardware constitution and the functional constitution of the image retrieving apparatus 101 in the present embodiment are the same as those in the first embodiment. Therefore, in the present embodiment, the portions different from the first embodiment will be described.

Figure 13:
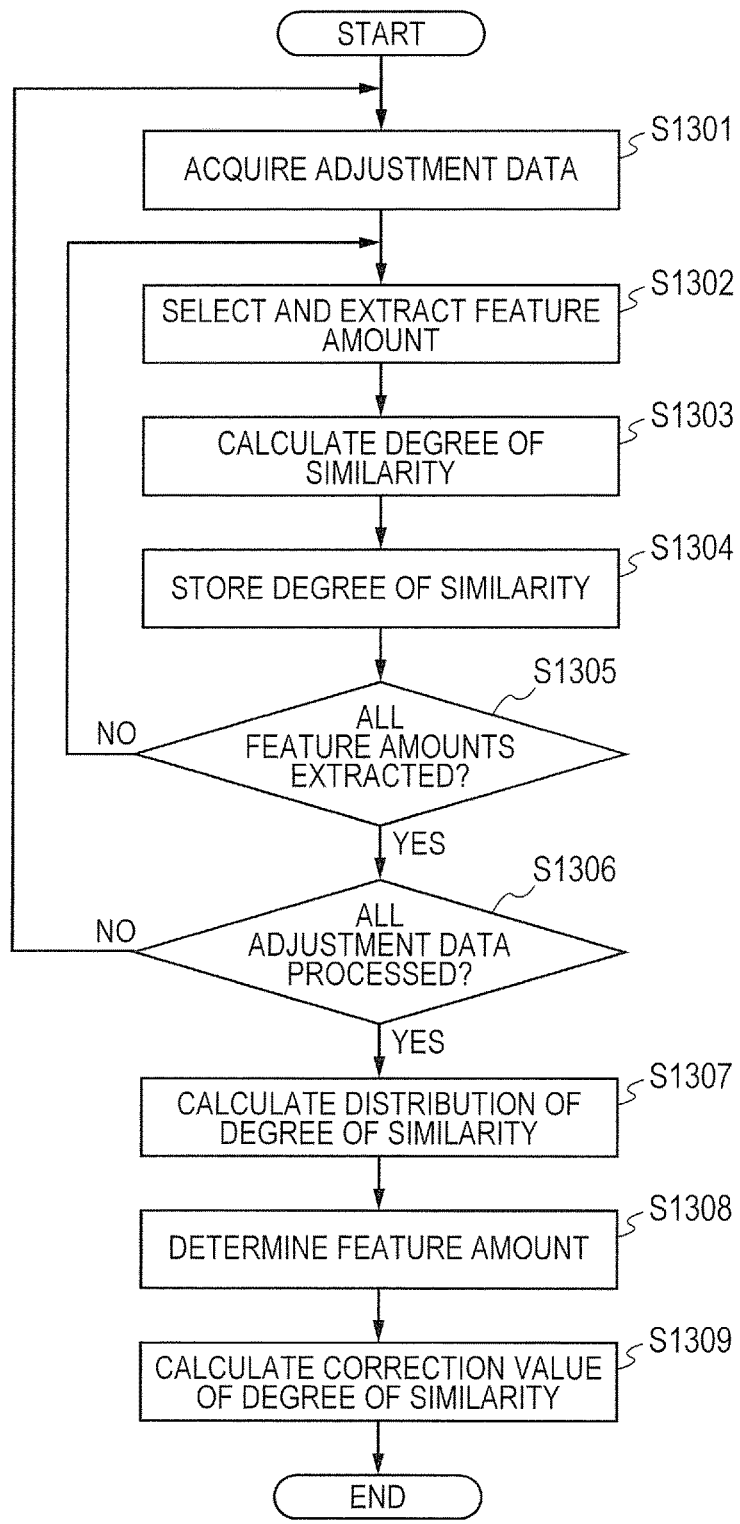
FIG. 13 is a flow chart for illustrating an example of the process of adjusting the collating process.

FIG. 13 is a flow chart for illustrating an example of the process of adjusting the collating process (method) by the image retrieving apparatus 101. Hereinafter, the collating method adjusting process of the present embodiment will be described with reference to FIG. 13.

In S1301, the collating method adjusting unit 205 acquires one piece of the adjustment data stored in the secondary storing device 114 by the adjustment data storing unit 204 in S705. As well as the first embodiment, the adjustment data in the present embodiment includes a pair of the image data of a person in question and a pair of the image data of other persons. Incidentally, it may be possible for the collating method adjusting unit 205 to acquire the plurality of adjustment data in a lump. Besides, it may be possible for the collating method adjusting unit 205 to separately acquire the person-in-question adjustment data and the other-person adjustment data respectively. Besides, it may be possible for the collating method adjusting unit 205 to acquire only the other-person adjustment data when the person-in-question adjustment data is not used in the adjustment of the collating process.

In S1302, the collating method adjusting unit 205 selects one feature amount from a plurality of set feature amounts. In the present embodiment, the collating method adjusting unit 205 selects the one feature amount from three features amounts of an LBP feature amount, an HOG feature amount and an SIFT feature amount. The collating method adjusting unit 205 extracts the pair of the feature amounts selected from the adjustment data acquired in S1301, that is, pairs of the face image data.

In S1303, the collating method adjusting unit 205 calculates the degree of similarity of the pair of the feature amounts extracted in S1302. Here, the method of calculating the degree of similarity in S1303 is the same as the method of calculating the degree of similarity in S405. However, since the correction value $\alpha_i$ is not yet set, the collating method adjusting unit 205 calculates the degree of similarity by using $\alpha_i=0$ as the default value in the expression (1).

In S1304, the collating method adjusting unit 205 stores the degree of similarity calculated in S1303 in the secondary storing device 114. At this time, the collating method adjusting unit 205 associates the information indicating whether the degree of similarity is calculated in S1303 from the person-in-question adjustment data or from the other-person adjustment data and the information of the feature amount selected in S1302, with the calculated degree of similarity, and stores them in the secondary storing device 114.

In S1305, the collating method adjusting unit 205 decides whether or not the process in S1302 to S1304 has been completed for all the feature amounts selectable in S1302. When the collating method adjusting unit 205 decides that the process in S1302 to S1304 has been completed for all the feature amounts selectable in S1302, the process is advanced to S1306. On the other hand, when the collating method adjusting unit 205 decides that there is a feature amount for which the process in S1302 to S1304 is not yet completed in the feature amounts selectable in S1302, the process is returned to S1302.

In S1306, the collating method adjusting unit 205 decides whether or not the process in S1301 to S1305 has been performed for all the adjustment data stored in the secondary storing device 114 by the adjustment data storing unit 204 in S705. When the collating method adjusting unit 205 decides that the process in S1301 to S1305 has been performed for all the adjustment data stored in the secondary storing device 114 by the adjustment data storing unit 204, the process is advanced to S1307. On the other hand, when the collating method adjusting unit 205 decides that there is adjustment data for which the process in S1301 to S1305 is not yet performed in the adjustment data stored in the secondary storing device 114 by the adjustment data storing unit 204, the process is returned to S1301.

In S1307, the collating method adjusting unit 205 calculates a distribution of degree of similarity based on all the degrees of similarity calculated in S1303, for each feature amount selected in S1302. The collating method adjusting unit 205 calculates the distribution of degree of similarity for each feature amount selected in S1302, on the basis of the degree of similarity acquired from the person-in-question adjustment data (hereinafter, this distribution will be called the person-in-question distribution of degree of similarity). Besides, the collating method adjusting unit 205 separately calculates the distribution of degree of similarity for each feature amount selected in S1302, on the basis of the degree of similarity acquired from the other-person adjustment data (hereinafter, this distribution will be called the other-person distribution of degree of similarity). The collating method adjusting unit 205 normalizes each of the person-in-question distribution of degree of similarity and the other-person distribution of degree of similarity such that the total sum thereof becomes 1. Moreover, it may be possible for the collating method adjusting unit 205 to calculate only the distribution of degree of similarity based on the degree of similarity acquired from the other-person adjustment data (hereinafter, the other-person distribution of degree of similarity), when the person-in-question adjustment data is not used in the adjustment of the collating process.

Figure 14:
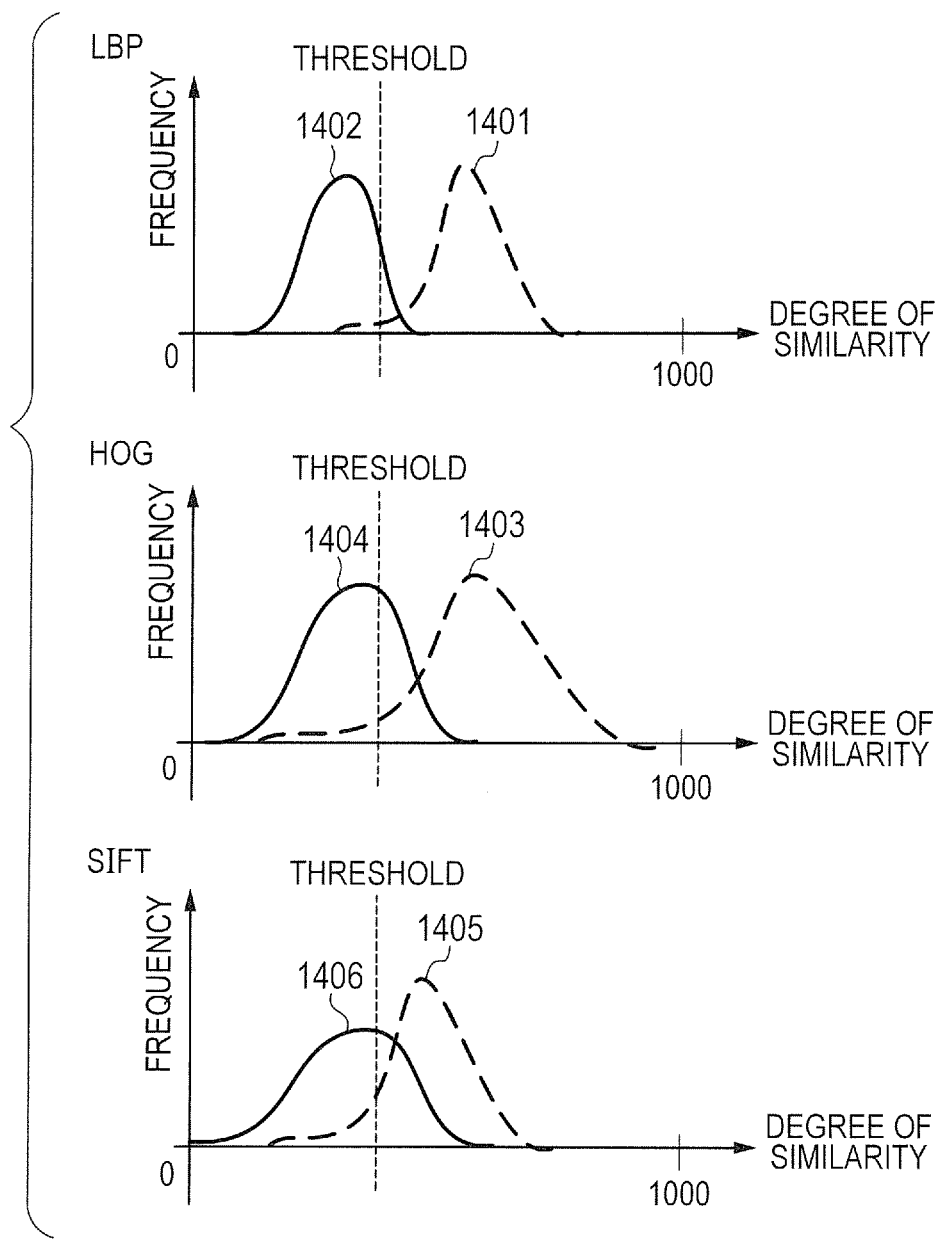
FIG. 14 is a set of graphs for illustrating an example of distributions of degree of similarity calculated for respective feature amounts.

In S1308, the collating method adjusting unit 205 determines one appropriate feature amount from all the feature amounts selected in S1302, as the final feature amount. FIG. 14 is a set of graphs for illustrating an example of the distributions of degree of similarity calculated for the respective feature amounts in S1307. More specifically, a person-in-question distribution of degree of similarity 1401 and an other-person distribution of degree of similarity 1402 of the LBP feature amount, a person-in-question distribution of degree of similarity 1403 and an other-person distribution of degree of similarity 1404 of the HOG feature amount, and a person-in-question distribution of degree of similarity 1405 and an other-person distribution of degree of similarity 1406 of the SIFT feature amount are shown in FIG. 14.

In the present embodiment, the collating method adjusting unit 205 selects the feature amount in which a histogram intersection occurred when the person-in-question distribution of degree of similarity and the other-person distribution of degree of similarity are respectively considered as histograms is the least. That is, the collating method adjusting unit 205 selects the feature amount that the overlap between the person-in-question distribution of degree of similarity and the other-person distribution of degree of similarity is the least, that is, the feature amount that a degree of separation between the person-in-question distribution of degree of similarity and the other-person distribution of degree of similarity is highest. Thus, it is possible for the collating method adjusting unit 205 to adjust the collating process so as to more improve accuracy, by selecting the feature amount having the highest collation accuracy from the selectable feature amounts. In the example illustrated in FIG. 14, the collating method adjusting unit 205 determines, as the final feature amount, the LBP feature amount that the overlap between the distributions of degree of similarity is the least (that is, the histogram intersection is small).

In S1309, the collating method adjusting unit 205 calculates the correction value of the degree of similarity for the feature amount determined in S1308, based on the distribution of degree of similarity calculated in S1307. In the monitoring/retrieving process, the displaying unit 209 compares in S408 the degree of similarity between the image photographed by each of the plurality of cameras for which the collating process has been adjusted independently and the image of the object being the retrieval target with the set threshold. However, in the present embodiment, there is a case where the feature amount to be used for each camera is different from others. Since the degrees of similarity calculated from the different feature amounts respectively have different ranges, it is impossible to directly compare the relevant degrees of similarity. Therefore, in order to be able to compare the relevant degrees of similarity, it is necessary to normalize each of the degrees of similarity to a predetermined value.

More specifically, the collating method adjusting unit 205 acquires the maximum value and the minimum value of the degree of similarity in the distribution of degree of similarity calculated in S1307, and acquires a difference between the acquired maximum value and the acquired minimum value, thereby calculating the range of the distribution of degree of similarity. Then, the collating method adjusting unit 205 calculates, as the correction value of the degree of similarity, a normalization constant to be used for normalizing the calculated range of the distribution of degree of similarity such that the relevant range comes to have a set width. For example, the collating method adjusting unit 205 calculates, as the normalization constant, a value obtained by dividing the value of the set width by the calculated range of the distribution of degree of similarity. In S406, the similarity correcting unit 213 corrects the degree of similarity by multiplying the degree of similarity acquired in S405 by the normalization constant calculated in S1309.

It may be possible for the collating method adjusting unit 205 to acquire the range of the distribution of degree of similarity from the minimum value and the maximum value of the degree of similarity in the other-person distribution of degree of similarity calculated in S1307, or to acquire the range of the distribution of degree of similarity from the minimum value and the maximum value of the degree of similarity in the person-in-question distribution of degree of similarity. Besides, it may be possible for the collating method adjusting unit 205 to acquire the range of the distribution of degree of similarity from the minimum value and the maximum value of the degree of similarity in the distribution acquired by combining the other-person distribution of degree of similarity and the person-in-question distribution of degree of similarity respectively calculated in S1307. Moreover, as well as the process in S1007, it may be possible for the collating method adjusting unit 205 to calculate the correction value for the distribution of degree of similarity.

The above is the description of the adjusting process of the collating process in the second embodiment.

In the monitoring/retrieving process, the image retrieving apparatus 101 retrieves the person using the kind of feature amount and the correction value of the degree of similarity acquired in the process of FIG. 13.

In the present embodiment, the image retrieving apparatus 101 selects the optimum feature amount from the three preset feature amounts. However, it may be possible for the image retrieving apparatus 101 to select the optimum feature amount from preset two or less preset feature amount, or to select the optimum feature amount from four or more preset feature amounts. Besides, it may be possible for the image retrieving apparatus 101 to select a plurality of feature amounts. Namely, it may be possible for the image retrieving apparatus 101 select, for example, two feature amounts from five preset feature amounts.

Although the collating method adjusting unit 205 selects the feature amount by comparing the overlaps between the person-in-question distribution of degree of similarity and the other-person distribution of degree of similarity in the present embodiment, it may be possible to select the feature amount based on another criterion. For example, it may be possible for the collating method adjusting unit 205 to select the feature amount based on a false acceptance rate and a false rejection rate for each feature amount, as well as the first embodiment.

As just described, by the process of the present embodiment, it is possible for the image retrieving apparatus 101 to select the feature amount which is more suitable for the matching process, so that the image retrieving apparatus 101 can further improve accuracy of the collating process.

Third Embodiment

The method of adjusting the correction value of the degree of similarity has been described in the first embodiment, and the method of adjusting the kind of feature amount has been described in the second embodiment. Here, it may be possible for the image retrieving apparatus 101 to adjust another collating process. For example, it may be possible for the image retrieving apparatus 101 to adjust whether or not to perform a preprocess such as a filtering process or the like to the face image data. More specifically, the collating unit 207, which further comprises a preprocessing unit, calculates a distribution of degree of similarity in a case where the preprocess is performed before the adjusting process and a distribution of degree of similarity in a case where the preprocess is not performed before the adjusting process. Then, as well as the second embodiment, the image retrieving apparatus 101 only has to select whether or not to perform the preprocess, by comparing and checking the overlap between the person-in-question distribution of degree of similarity and the other-person distribution of degree of similarity.

Besides, it is possible for the image retrieving apparatus 101 to adjust parameters of the feature amount, methods of calculating the degree of similarity, and the like.

In the first and second embodiments, the image retrieving apparatus 101 performs the collating process by using the image of the entire face. However, it may be possible to first define local regions within the face image, and then calculate the degree of similarity for each of the defined local regions. In that case, it is also possible for the image retrieving apparatus 101 to adjust which local region should be used for the collating process. More specifically, the collating unit 207, which further comprises a feature point detecting unit for detecting a feature point from the face image, defines the local region in the face image data on the basis of the feature point detected by the feature point detecting unit. In the adjusting process, it is possible for the collating unit 207 to select the local region to be used for the collating process, by calculating the distribution of degree of similarity for each of the defined local regions and comparing and checking the overlap of the person-in-question distribution of degree of similarity and the other-person distribution of degree of similarity. Thus, it becomes possible for the image retrieving apparatus 101 to perform the collating process by using the feature amount of the part, in the entire object image, where a difference easily appears between the objects, so that it is possible to perform the more accurate collating process. For example, in a case where the feature amount of the local region where light strikes strongly depending on sunshine conditions is used, the difference for each object is hard to appear.

Besides, when the collating process is performed by using a neural network, it is also possible for the image retrieving apparatus 101 to adjust (learn) parameters of the neural network by using the person-in-question adjustment data and the other-person adjustment data.

In the first and second embodiments, the image retrieving apparatus 101 performs the collating process by the collating unit 207 after performing the object detecting process by the object detecting unit 202. However, it may be possible for the image retrieving apparatus 101 to treat the object detecting process as the target to be adjusted by the adjusting process, by regarding the object detecting process as a part of the collating process. For example, it may be possible for the image retrieving apparatus 101 to adjust the size and the direction of the object to be detected, the parameters of the object at the time of the detection, or the like. Thus, it is possible for the image retrieving apparatus 101 to perform the more accurate collating process by adjusting the object detecting process so as to be able to perform the collating process more accurately.

Besides, in a case where the camera is installed in an outdoor location, the photographing condition such as the sunshine condition or the like changes depending on the time. In the adjusting processes of the first and second embodiments, since a change of the photographing condition depending on the time is not taken into consideration, there is a case where the collating process cannot be adjusted properly. Therefore, in order to properly adjust the collating process, the adjustment data acquiring unit 203 acquires the adjustment data together with the information indicating the photographing time. Besides, the collating method adjusting unit 205 previously divides the time from 0 o'clock to 24 o'clock into set periods, and then adjusts the collating process in accordance with to which the period the photographing time of the image of the adjustment data belongs. By doing so, it is possible for the image retrieving apparatus 101 to appropriately adjust the collating process also for outdoor cameras according to the change of the photographing condition depending on the time. Besides, it is also possible for the image retrieval apparatus 101 to similarly adjust the collating process according to a change of the weather. Besides, it may be possible for the image retrieving apparatus 101 to adjust the collating process according to a change of the intensity of the indoor lighting equipment or a change of the photographing condition such as ON/OFF of the lighting equipment.

In the first and second embodiments, the image retrieving apparatus 101 acquires the person-in-question adjustment data by tracking the same object of the plurality of frames photographed and captured by the same camera. However, it is also possible to acquire the person-in-question adjustment data by another method. For example, if a multi-camera tracking technique is used, it is possible for the image retrieving apparatus 101 to continue tracking the same person photographed by the camera 102, the camera 103 and the camera 104, and it is thus possible to acquire the adjustment data for the same person captured in the different photographing conditions (cameras). Here, as for the image data which indicates the same person and are photographed and captured in the different illumination conditions, the degree of similarity between the mutual image data tends to be low. For this reason, it is possible for the image retrieving apparatus 101 to acquire the adjustment data for the same person captured in the different photographing conditions, as the adjustment data for the range of the person-in-question distribution of degree of similarity in which the included degree of similarity is lower than the median value of the distribution. It is possible for the image retrieving apparatus 101 to adjust the collating process in which the false rejection rate is more accurately controlled, on the basis of adjustment data for the same person captured in the different photographing conditions.

Other Embodiments

The invention can be achieved also on the condition that a program of achieving one or more functions of the above embodiments is provided to a system or an apparatus via a network or a storage medium and one or more processors in the computer of the system or the apparatus reads and executes the program. Besides, the invention can also be achieved by a circuit (e.g., an ASIC) which achieves the one or more functions of the above embodiments.

Although the preferred embodiments of the invention have been described in detail as described above, the present invention is not limited to the above specific embodiments.

For example, it may be possible to implement a part or all of the functional constitution of the image retrieving apparatus 101, on the image retrieving apparatus 101 as hardware.

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2016-000700, filed Jan. 5, 2016, which is hereby incorporated by reference herein in its entirety.

What is claimed is:

1. An image processing apparatus comprising:
one or more processors; and
a memory coupled to the one or more processors, the memory having stored thereon instructions which, when executed by the one or more processors, cause the image processing apparatus to:
    detect a face of a person from an input image photographed by each of a plurality of imaging devices;
    extract a feature amount of the detected face;
    in a case where a plurality of faces have been detected from the same input image, calculate a degree of similarity of respective feature amounts of the plurality of detected faces as a degree of similarity of respective feature amounts of faces of different persons; and
    adjust a collating method of collating the plurality of faces for each of the imaging devices, based on the calculated degree of similarity of the respective feature amounts of faces of different persons, so as to decrease erroneous matching in collating between faces of different persons.

2. The image processing apparatus according to claim 1, wherein in adjusting the collating method, the instructions, when executed by the one or more processors, cause the image processing apparatus to:
    calculate a statistic of the degrees of similarity for the plurality of input images, and adjust the collating method based on the statistic.

3. The image processing apparatus according to claim 2, wherein
    the statistic is a frequency distribution of the degrees of similarity.

4. The image processing apparatus according to claim 1, wherein the instructions, when executed by the one or more processors, further cause the image processing apparatus to:
    correct the degree of similarity of the feature amounts of the plurality of faces.

5. The image processing apparatus according to claim 1, wherein in adjusting the collating method, the instructions, when executed by the one or more processors, cause the image processing apparatus to:
    modify and set a threshold of the degree of similarity to be used for deciding that the plurality of faces are the same in the collation.

6. An image processing apparatus comprising:
one or more processors; and
a memory coupled to the one or more processors, the memory having stored thereon instructions which, when executed by the one or more processors, cause the image processing apparatus to:
    detect a face of a person from a frame image of an input moving image;
    extract a feature amount of the detected face;
    track the detected face for a plurality of frame images;
    in a case where a plurality of faces have been detected from the same input image, calculate a degree of similarity of respective feature amounts of the plurality of detected faces as a first degree of similarity of a respective feature amounts of faces of different persons;
    calculate a degree of similarity of respective feature amounts of the face tracked in the plurality of frame images as a second degree of similarity of respective feature amounts of faces of an identical person; and
    adjust a collating method of collating the plurality of faces based on the calculated first degree of similarity of the respective feature amounts of faces of different persons, so as to decrease erroneous matching in collating between faces of different persons, and adjust the collating method based on the calculated second degree of similarity of the feature amounts of faces of the identical person so as to decrease erroneous matching in collating between faces of an identical person.

7. The image processing apparatus according to claim 1, wherein in adjusting the collating method, the instructions, when executed by the one or more processors, cause the image processing apparatus to:
    select a kind of feature amount used in the collation.

8. The image processing apparatus according to claim 1, wherein in adjusting the collating method, the instructions, when executed by the one or more processors, cause the image processing apparatus to:
    select a region of the face used in the collation.

9. The image processing apparatus according to claim 1, wherein in adjusting the collating method, the instructions, when executed by the one or more processors, cause the image processing apparatus to:
    determine weighting of a region of the face used in the collation.

10. The image processing apparatus according to claim 1, wherein the instructions, when executed by the one or more processors, further cause the image processing apparatus to:
    perform the collation by the collating method adjusted.

11. The image processing apparatus according to claim 1, wherein the instructions, when executed by the one or more processors, further cause the image processing apparatus to:
    display information indicating whether or not an adjusting process has been completed for each of the imaging devices.

12. The image processing apparatus according to claim 1, wherein the instructions, when executed by the one or more processors, further cause the image processing apparatus to:
    display information indicating an amount of adjustment data necessary for completion of the adjusting process, for each of the imaging devices.

13. An image processing method comprising:
    detecting a face of a person from an input image photographed by each of a plurality of imaging devices;
    extracting a feature amount of the detected face;
    in a case where a plurality of faces have been detected from the same input image, calculating a degree of similarity of respective feature amounts of the plurality of detected faces as a degree of similarity of respective feature amounts of faces of different persons; and
    adjusting a collating method of collating the plurality of faces for each of the imaging devices, based on the calculated degree of similarity of the respective feature amounts of faces of different persons, so as to decrease erroneous matching in collating between faces of different persons.

14. A non-transitory computer-readable storage medium storing a program that, when executed by a computer, causes the computer to execute a method comprising:
    detecting a face of a person from an input image photographed by each of a plurality of imaging devices;
    extracting a feature amount of the detected face;

in a case where a plurality of faces have been detected from the same input image, calculating a degree of similarity of respective feature amounts of the plurality of detected faces as a degree of similarity of respective feature amounts of face of different persons; and adjusting a collating method of collating the plurality of faces for each of the imaging devices, based on the calculated degree of similarity of the respective feature amounts of faces of different persons, so as to decrease erroneous matching in collating between faces of different persons.

15. An image processing method comprising:

detecting a face of a person from a frame image of an input moving image;

extracting a feature amount of the detected face;

tracking the detected face for a plurality of frame images;

in a case where a plurality of faces have been detected from the same input image, calculating a degree of similarity of respective feature amounts of the plurality of detected faces as a first degree of similarity of a respective feature amounts of faces of different persons;

calculating a degree of similarity of respective feature amounts of the face tracked in the plurality of frame images as a second degree of similarity of respective feature amounts of faces of an identical person; and adjusting a collating method of collating the plurality of faces based on the calculated first degree of similarity of the respective feature amounts of faces of different persons, so as to decrease erroneous matching in collating between faces of different persons, and adjust the collating method based on the calculated second degree of similarity of the feature amounts of faces of the identical person so as to decrease erroneous matching in collating between faces of an identical person.

16. A non-transitory computer-readable storage medium storing a program that, when executed by a computer, causes the computer to execute a method comprising:

detecting a face of a person from a frame image of an input moving image;

extracting a feature amount of the detected face;

tracking the detected face for a plurality of frame images;

in a case where a plurality of faces have been detected from the same input image, calculating a degree of similarity of respective feature amounts of the plurality of detected faces as a first degree of similarity of a respective feature amounts of faces of different persons;

calculating a degree of similarity of respective feature amounts of the face tracked in the plurality of frame images as a second degree of similarity of respective feature amounts of faces of an identical person; and adjusting a collating method of collating the plurality of faces based on the calculated first degree of similarity of the respective feature amounts of faces of different persons, so as to decrease erroneous matching in collating between faces of different persons, and adjust the collating method based on the calculated second degree of similarity of the feature amounts of faces of the identical person so as to decrease erroneous matching in collating between faces of an identical person.

* * * * *